United States Patent
Sharrah et al.

(10) Patent No.: US 11,674,676 B2
(45) Date of Patent: Jun. 13, 2023

(54) BATTERY ASSEMBLY FOR A HAND HOLDABLE LIGHT

(71) Applicant: STREAMLIGHT, INC., Eagleville, PA (US)

(72) Inventors: Raymond L. Sharrah, Collegeville, PA (US); Peter J. Ziegenfuss, Sellersville, PA (US); Thomas D. Boris, Collegeville, PA (US); Francis D. Arena, Chalfont, PA (US)

(73) Assignee: Streamlight, Inc., Eagleville, PA (US)

( * ) Notice: Subject to any disclaimer, the term of this patent is extended or adjusted under 35 U.S.C. 154(b) by 511 days.

(21) Appl. No.: 16/987,158

(22) Filed: Aug. 6, 2020

(65) Prior Publication Data
US 2021/0215302 A1   Jul. 15, 2021

Related U.S. Application Data

(60) Provisional application No. 62/959,438, filed on Jan. 10, 2020.

(51) Int. Cl.
*F21V 23/04* (2006.01)
*H01M 50/519* (2021.01)
(Continued)

(52) U.S. Cl.
CPC .............. *F21V 21/406* (2013.01); *F21L 4/00* (2013.01); *F21L 4/005* (2013.01);
(Continued)

(58) Field of Classification Search
CPC .. H01M 50/519; H01M 50/50; H01M 50/296; H01M 50/502; H01M 50/574;
(Continued)

(56) References Cited

U.S. PATENT DOCUMENTS

| 4,803,605 A | 2/1989 | Schaller |
| 5,432,689 A | 7/1995 | Sharrah et al. |

(Continued)

OTHER PUBLICATIONS

United States Patent and Trademark Office, "Notice of Allowance", U.S. Appl. No. 16/987,134, dated Mar. 4, 2021, 4 pages.
(Continued)

*Primary Examiner* — Brian R Ohara
*Assistant Examiner* — Claire L Roe
(74) *Attorney, Agent, or Firm* — Clement A. Berard, Esq.; Dann, Dorfman, Herrell & Skillman, PC

(57) ABSTRACT

A hand holdable light comprises: a light body having a forward portion, a rearward portion, and a central portion between the forward portion and to the rearward portion; a light source proximate a forward end; and a switch for energizing the light source. The rearward portion has a non-circular cross-section; the switch is on the forward portion; and the central portion has a recess opposite the switch. The light is holdable by a hand with a finger or thumb proximate the recess and the other of a finger or thumb proximate the switch. A battery assembly comprises: a battery housing for receiving and connecting a battery; an electrical switch on a first end of the battery housing; and a pattern of electrical contacts on a second end of the battery housing, wherein ones of the electrical contacts are connected to the battery.

23 Claims, 23 Drawing Sheets

(51) Int. Cl.
| | |
|---|---|
| *H01M 50/50* | (2021.01) |
| *H01M 50/574* | (2021.01) |
| *H01R 33/955* | (2006.01) |
| *H01M 50/502* | (2021.01) |
| *H01M 50/213* | (2021.01) |
| *F21V 21/40* | (2006.01) |
| *F21V 31/00* | (2006.01) |
| *F21L 4/00* | (2006.01) |
| *H01M 50/247* | (2021.01) |
| *H01M 50/296* | (2021.01) |
| *H01R 11/28* | (2006.01) |
| *H01R 12/71* | (2011.01) |
| *H01R 33/18* | (2006.01) |
| *H01R 33/88* | (2006.01) |
| *H01R 33/90* | (2006.01) |
| *F21Y 115/10* | (2016.01) |
| *F21V 19/00* | (2006.01) |

(52) U.S. Cl.
CPC ...... *F21V 23/0414* (2013.01); *F21V 23/0428* (2013.01); *F21V 31/005* (2013.01); *H01M 50/213* (2021.01); *H01M 50/247* (2021.01); *H01M 50/296* (2021.01); *H01M 50/50* (2021.01); *H01M 50/502* (2021.01); *H01M 50/519* (2021.01); *H01M 50/574* (2021.01); *H01R 11/281* (2013.01); *H01R 12/714* (2013.01); *H01R 33/18* (2013.01); *H01R 33/88* (2013.01); *H01R 33/90* (2013.01); *H01R 33/955* (2013.01); *F21V 19/001* (2013.01); *F21Y 2115/10* (2016.08); *H01M 2220/30* (2013.01)

(58) Field of Classification Search
CPC ................ H01M 50/213; F21V 21/406; F21V 23/0414; F21V 23/005; F21L 4/00; F21L 4/005
See application file for complete search history.

(56) References Cited

U.S. PATENT DOCUMENTS

| | | | |
|---|---|---|---|
| 5,558,430 | A | 9/1996 | Booty, Jr. |
| 6,099,147 | A | 8/2000 | Ziegenfuss |
| 6,183,106 | B1 | 2/2001 | Thummel et al. |
| 6,621,225 | B2 | 9/2003 | Bruwer |
| 6,652,115 | B2 | 11/2003 | Sharrah |
| D484,627 | S | 12/2003 | Mah |
| 6,952,084 | B2 | 10/2005 | Bruwer |
| 7,084,531 | B2 | 8/2006 | Bruwer |
| 7,220,013 | B2 | 5/2007 | Sharrah et al. |
| 7,220,016 | B2 | 5/2007 | Matthews et al. |
| D592,339 | S | 5/2009 | Crawford |
| 7,652,216 | B2 | 1/2010 | Sharrah et al. |
| 7,674,003 | B2 | 3/2010 | Sharrah et al. |
| 7,722,209 | B2 | 5/2010 | Matthews et al. |
| 7,880,100 | B2 | 2/2011 | Sharrah et al. |
| RE42,945 | E | 11/2011 | Sharrah et al. |
| 8,096,674 | B2 | 1/2012 | Matthews et al. |
| 8,258,416 | B2 | 9/2012 | Sharrah et al. |
| D668,803 | S | 10/2012 | Yang |
| 8,356,910 | B2 | 1/2013 | Messinger et al. |
| 8,360,598 | B2 | 1/2013 | Sharrah et al. |
| D687,990 | S | 8/2013 | Yeh |
| D689,230 | S | 9/2013 | Yeh |
| 8,662,701 | B2 | 3/2014 | Sharrah et al. |
| 8,690,377 | B2 | 4/2014 | Weber |
| 8,807,781 | B2 | 8/2014 | Weber |
| 8,944,626 | B2 | 2/2015 | Matthews et al. |
| D728,139 | S | 4/2015 | Wang |
| D732,481 | S | 6/2015 | Chang et al. |
| 9,188,292 | B2 | 11/2015 | Armer et al. |
| D745,987 | S | 12/2015 | Nawaz |
| D765,295 | S | 8/2016 | McLennan |
| 9,541,244 | B1 | 1/2017 | Berezinski |
| 9,651,208 | B2 | 5/2017 | Sharrah et al. |
| D797,882 | S | 9/2017 | Tang |
| 9,927,209 | B2 | 3/2018 | Sharrah et al. |
| D817,528 | S | 5/2018 | Wu |
| D849,979 | S | 5/2019 | Lehovetzki |
| 10,326,292 | B2 | 6/2019 | Zeisler et al. |
| D855,851 | S | 8/2019 | Kotsis |
| 10,378,744 | B2 | 8/2019 | Arena et al. |
| D861,215 | S | 9/2019 | Sharrah |
| D871,043 | S | 12/2019 | Prochmann |
| D874,606 | S | 2/2020 | Yang |
| D884,946 | S | 5/2020 | Muyshondt |
| D893,784 | S | 8/2020 | Wu |
| D899,647 | S | 10/2020 | Shan |
| D899,649 | S | 10/2020 | Qiu |
| 11,054,124 | B2 | 7/2021 | Sharrah et al. |
| 2003/0206410 | A1 | 11/2003 | Parsons et al. |
| 2005/0122715 | A1* | 6/2005 | Furth ............... H01M 50/267 362/208 |
| 2007/0172724 | A1* | 7/2007 | Furth ............... H01M 50/213 429/97 |
| 2010/0091485 | A1 | 4/2010 | Matthews et al. |
| 2016/0268731 | A1 | 9/2016 | Ziegenfuss et al. |
| 2017/0284646 | A1 | 10/2017 | Arena et al. |
| 2019/0017689 | A1 | 1/2019 | Parsons |

OTHER PUBLICATIONS

United States Patent and Trademark Office, "Issue Notification", U.S. Appl. No. 16/987,134, dated Jun. 16, 2021, 1 page.

Email from "epct-noreply@wipo.int" to "docket clerk" entitled "PCT/US2020/045369—Form PCT/16326" dated Mar. 3, 2022. (2 pages).

"PCT International Preliminary Report on Patentablity" dated Feb. 17, 2022 by the International Bureau of WIPO in PCT Application PCT/US2020/045369 as attached to Item 1. (13 pages).

Form/PCT/IB/326 "Notification Concerning Transmittal of PCT International Preliminary Report on Patentablity . . . " dated Mar. 3, 2022 by the International Bureau of WIPO in PCT Application PCT/US2020/045369 as attached to Item 1 above. (1 page).

"PCT Notification of Transmittal of the International Search Report and the Written Opinion of the International Searching Authority, or the Declaration" dated Nov. 30, 2020 by the International Bureau of WIPO in PCT Application PCT/US2020/045369. (18 pages).

Streamlight, Inc., "4AA ProPolymax®—Long-Range High Lumen 7" Polymer Flashlight, dated 2019, 2 pages, https://www.streamlight.com/products/detail/index/4aa-propolymax.

Streamlight, Inc., "Stinger Switchblade® LED Rechargeable Area Light", Product Fact Sheet, Document #311, Issued: Oct. 16, 2017, Revised: Sep. 25, 2019, 1 page.

Streamlight, Inc., "Stinger Switchblade®—Super Bright, 800 Lumen Rechargeable Light Bar with 180 Degree Rotation", dated 2019, 2 pages, https://www.streamlight.com/products/detail/index/stinger-switchblade.

Streamlight, Inc., "Stinger Switchblade® Multi-Function Worklight", Data Sheet, dated 2019, 1 pg.

Streamlight, Inc., "Dualie® 3AA—Intrinsically Safe, Multi-Function Flashlight with Optional Magnetic Clip", dated 2019, 2 pgs, https://www.streamlight.com/products/detail/index/dualie-3aa.

Streamlight, Inc., "Dualie® 3AA—Intrinsically Safe, Multi-Function Flashlight", Data Sheet, dated Jul. 2016, 1 page.

Streamlight, Inc., "Dualie® 3AA—Dual Function Intrinsically Safe AA Battery Flashlight", Product Fact Sheet, Document #170, Issued: Jul. 6, 2015, Revised: Jun. 11, 2018, 1 page.

Streamlight, Inc., "Dualie® 3AA", Operating Instructions, dated Nov. 2016, 2 pages.

Streamlight, Inc., "4AA ProPolymer®—LED Flashlight, Safety-Rated LED Flashlight with Long Runtime", undated, 1 pg, https://www.streamlight.com/products/detail/index/4aa-propolymer-led.

Streamlight, Inc., "4AA LED ProPolymer®—Alkaline Battery-Powered Flashlight", Product Fact Sheet, Document #118, Issued: Oct. 1, 2004, Revised: Feb. 5, 2007, 1 page.

(56) References Cited

OTHER PUBLICATIONS

Streamlight, Inc., "ProPolymer®", Operating Instructions, dated Aug. 2011, 2 pages.
Streamlight, Inc., "Stinger DS®—LED Flashlight—All Purpose, Rechargeable Dual Switch Flashlight", undated, 2 pages, https://www.streamlight.com/products/detail/index/stinger-ds-led.
Streamlight, Inc., "Stinger Ds® LEED—Rechargeable LED Flashlight", Data Sheet, dated Sep. 2018, 2 pages.
Streamlight, Inc., "Stinger DS® LED Rechargeable Flashlight", Product Fact Sheet, Document #201, Issued: Oct. 13, 2006, Revised: May 8, 2019, 1 page.
Streamlight, Inc., "Stinger ® LED Family", Operating Instructions, dated Dec. 2016, 2 pages.
Streamlight, Inc., "Hand Holdable Light Having an Ergonomic Grip and a Battery Assembly Therefor", U.S. Appl. No. 16/987,134, filed Aug. 9, 2020, 114 pages.

\* cited by examiner

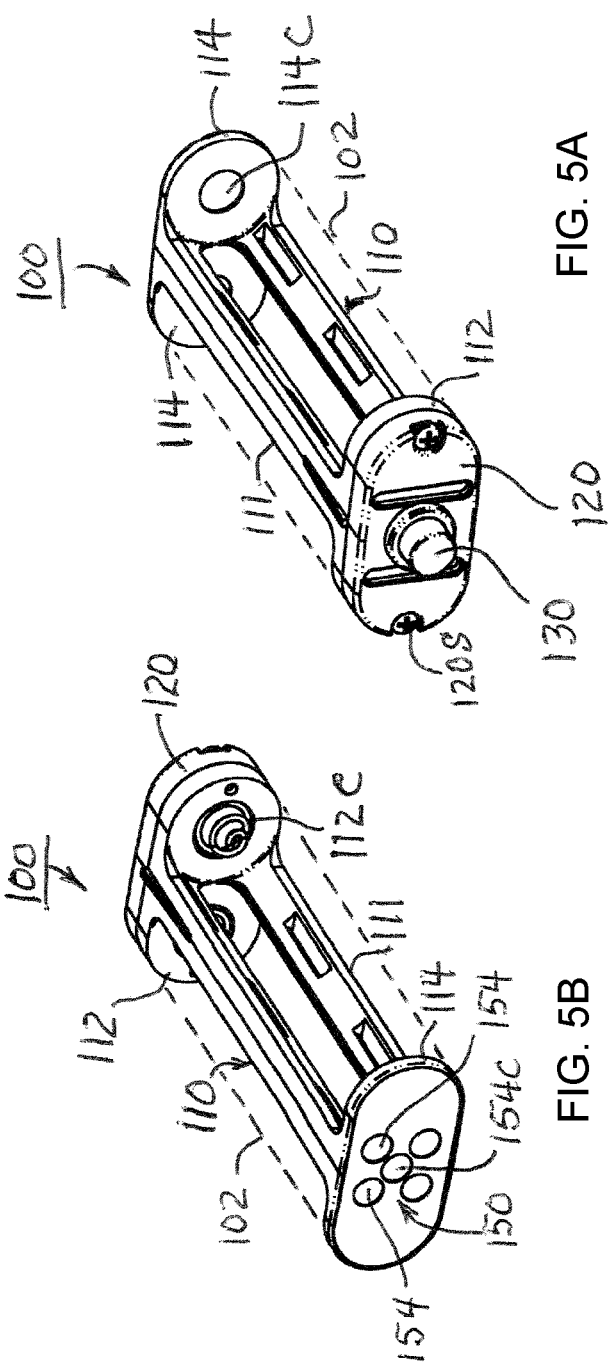

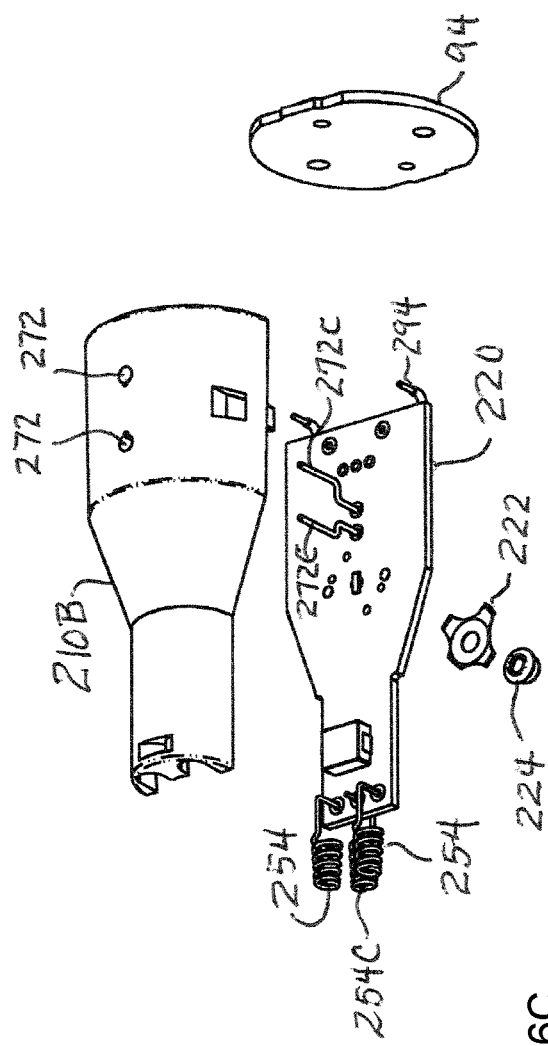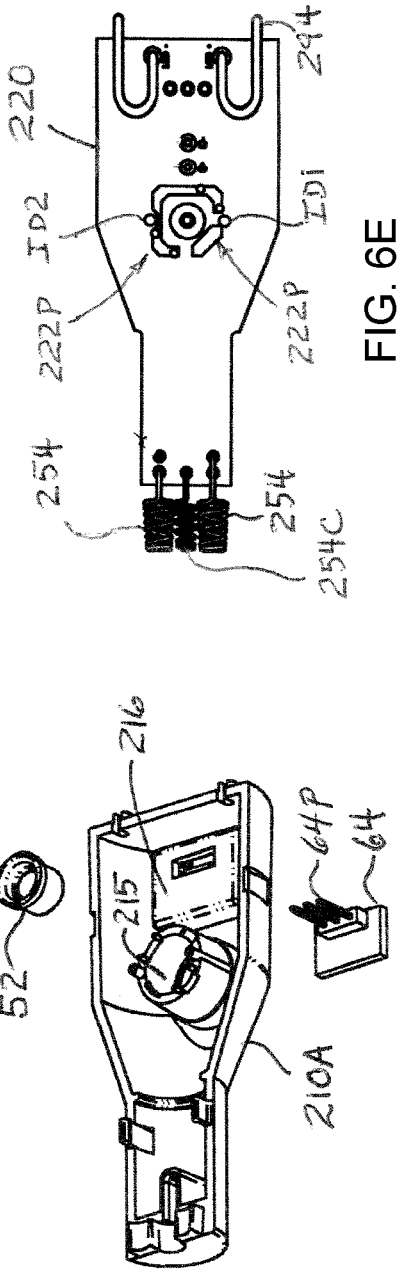

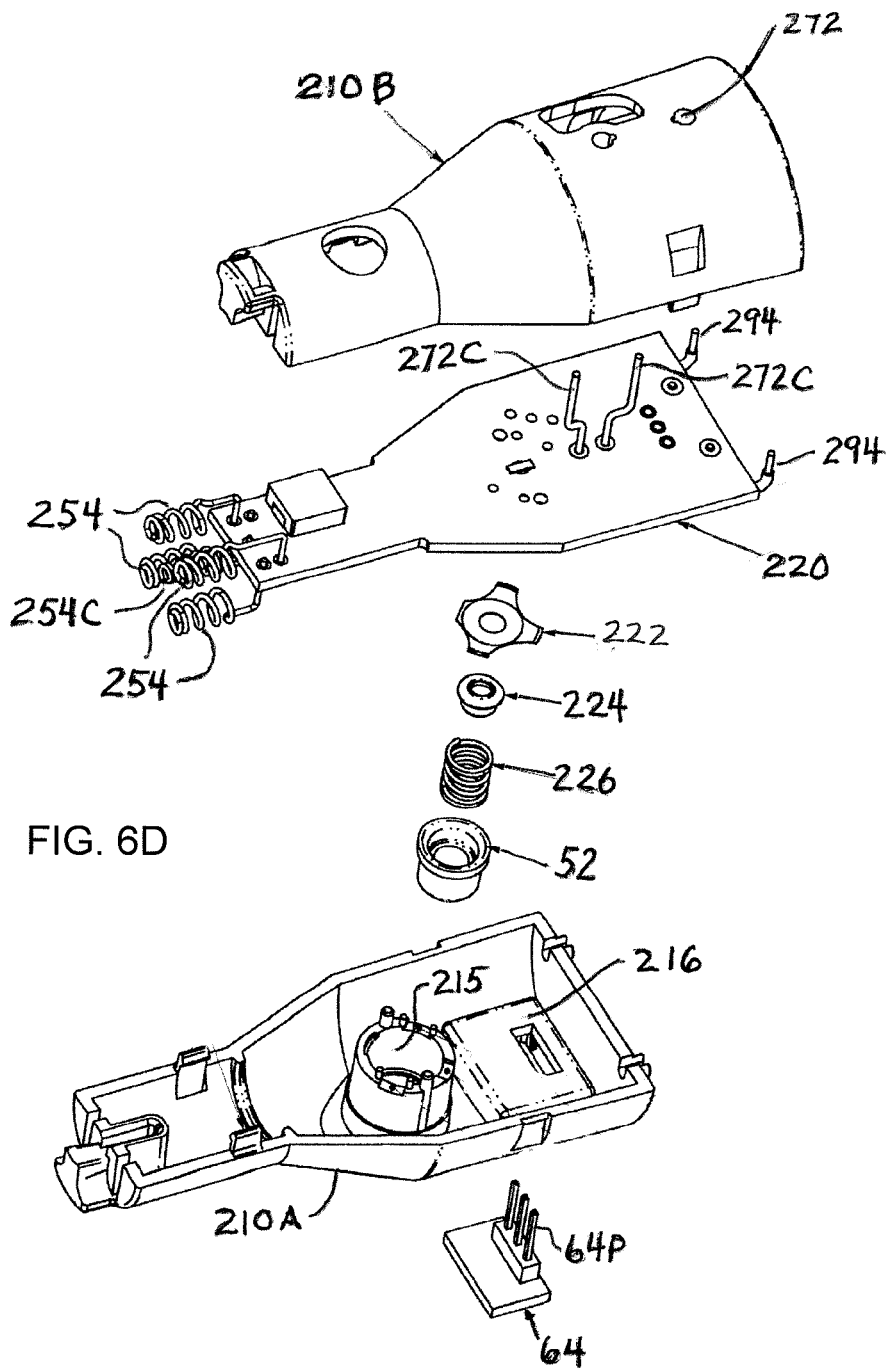

BATTERY ASSEMBLY FOR A HAND HOLDABLE LIGHT

This Patent application claims the benefit of U.S. Patent Application No. 62/959,438 entitled "HAND HOLDABLE LIGHT HAVING AN ERGONOMIC GRIP AND A BATTERY ASSEMBLY THEREFOR" filed Jan. 10, 2020; which is hereby incorporated herein by reference in its entirety.

The present invention relates to a hand holdable light, in particular, to a hand holdable light having an ergonomic grip.

The present invention also relates to a battery assembly for a light.

Hand held lights typically have a cylindrical body that serves as a grip for a user thereof and that also usually has an internal cavity for one or more batteries. The grip portion of some known lights may be like a flattened cylinder, e.g., approximating an oval-like or ellipse-like shape, which may make it easier to contain plural battery cells. Examples thereof include, e.g., a 4AA PROPOLYMER® flashlight which has four AA cells arranged with two side-by-side sets each of two cells end-to-end, and a DUALIE® 3AA flashlight which has three AA cells arranged with two cells that are end-to-end and a third cell alongside the two cells that are end-to-end, both of which lights are commercially available from Streamlight, Inc. of Eagleville Pa., USA.

Users of lights with various differently shaped grips generally adapt their grip so as to find a relatively comfortable way to grip those lights, but some grip shapes are simply not sufficiently conformed to a user's hand as to be comfortable.

Moreover, lights having a cylindrical or flattened cylindrical grip, and other symmetrical or quasi-symmetrical shapes, can be "ambiguous" to a user who after picking up such light must then finger around to locate its actuator, and possibly change his grip on the light, before the actuator is in a position where the user is able to operate (actuate) the light.

Applicant believes there may be a need for a light that has a grip that is configured to comfortably receive a user's hand including receiving the fingers used to operate the light, particularly where the light may be gripped in various different ways.

Accordingly, a hand holdable light may comprise: a light body having a forward portion, a rearward portion, and a central portion between and adjacent to the forward portion and to the rearward portion; a light source proximate the forward end; and a switch for selectively energizing the light source from the source of electrical power. The rearward portion of the light body has a non-circular cross-section; the switch is on the forward portion; and the central portion has a recess opposite the switch actuator; whereby the light is holdable by a hand having a finger or a thumb proximate the recess and the other of a finger or a thumb proximate the switch.

A hand holdable light may also comprise: a light body having a forward portion proximate a forward end thereof, a rearward portion proximate a rearward end thereof, and a central portion between and adjacent to the forward portion and to the rearward portion thereof; a light source proximate the forward end; a first switch actuator for selectively energizing the light source; and a cover at the rearward end of the light body. The cover may include a second switch actuator for selectively energizing the light source. The rearward portion of the light body has a non-circular cross-section having a larger transverse dimension and a smaller transverse dimension; wherein the first switch actuator is disposed substantially on the forward portion of the light body; wherein the central portion of the light body has a transverse dimension that is less than the larger transverse dimension of the rearward portion, thereby defining a recess in the central portion opposite to the first switch actuator; whereby the light is holdable by a hand having a palm proximate the rearward portion, a finger or a thumb proximate the recess of the central portion and the other of a finger or a thumb proximate the first switch actuator.

A battery assembly may comprise: a battery housing having a receptacle for receiving a battery and electrical contacts to which the battery connects; an electrical switch on a first end of the battery housing; and a pattern of electrical contacts on a second end of the battery housing, wherein ones of the electrical contacts are connected to the battery.

Further, a battery assembly may comprise: a battery housing having a receptacle for receiving a battery and having at least two electrical contacts to which terminals of the battery connect; an electrical switch on the battery housing, the electrical switch having an externally accessible actuator for making and breaking an electrical connection between a first electrical switch contact and a second electrical switch contact; and a symmetrical pattern of externally accessible electrical contacts on the battery housing. The symmetrical pattern may include: first and second electrical contacts; the third one of the externally contacts is located centrally within the pattern; the first one of the electrical contacts is located symmetrically on the pattern with a fourth one of the electrical contacts; and the second one of the electrical contacts is located symmetrically on the pattern with a fifth one of the electrical contacts. Connection to the battery assembly may be made by three contacts of a use device contacts with the battery assembly being in at least two different orientations relative to the three contacts of the use device.

In summarizing the arrangements described and/or claimed herein, a selection of concepts and/or elements and/or steps that are described in the detailed description herein may be made or simplified. Any summary is not intended to identify key features, elements and/or steps, or essential features, elements and/or steps, relating to the claimed subject matter, and so are not intended to be limiting and should not be construed to be limiting of or defining of the scope and breadth of the claimed subject matter.

BRIEF DESCRIPTION OF THE DRAWING

The detailed description of the preferred embodiment(s) will be more easily and better understood when read in conjunction with the FIGURES of the Drawing which include:

FIGS. 5A and 5B are perspective views of an example embodiment of a battery assembly for the example hand holdable light.

FIG. 6C is an exploded view thereof, FIG. 6D is an exploded view of a modified example thereof, and FIG. 6E is a plan view of the example circuit board of the modified example thereof and FIG. 7A and FIG. 7B are perspective and side views, respectively, of an example hand holdable light

Figure 1A:
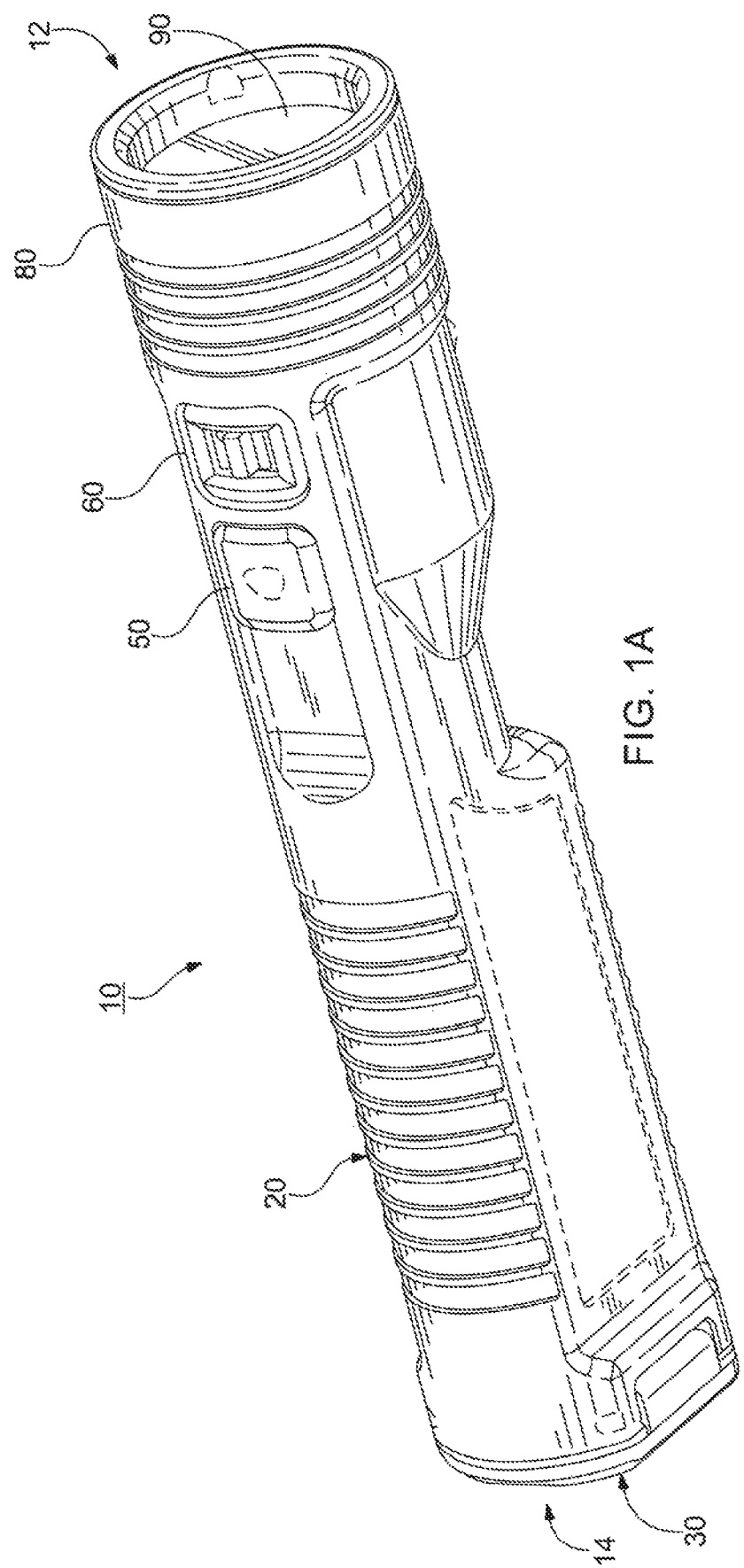
FIGS. 1A and 1B are first and second perspective views of an example embodiment of a hand holdable light.

In the Drawing, where an element or feature is shown in more than one drawing figure, the same alphanumeric designation may be used to designate such element or feature in each figure, and where a closely related or modified element is shown in a figure, the same alphanumerical designation may be primed to designate the modified element or feature. Similar elements or features may be designated by like alphanumeric designations in different figures of the Drawing and with similar nomenclature in the specification. As is common, the various features of the drawing are not to scale, the dimensions of the various features may be arbitrarily expanded or reduced for clarity, and each Figure is by way of example only.

DESCRIPTION OF THE PREFERRED EMBODIMENT(S)

Figure 1B:
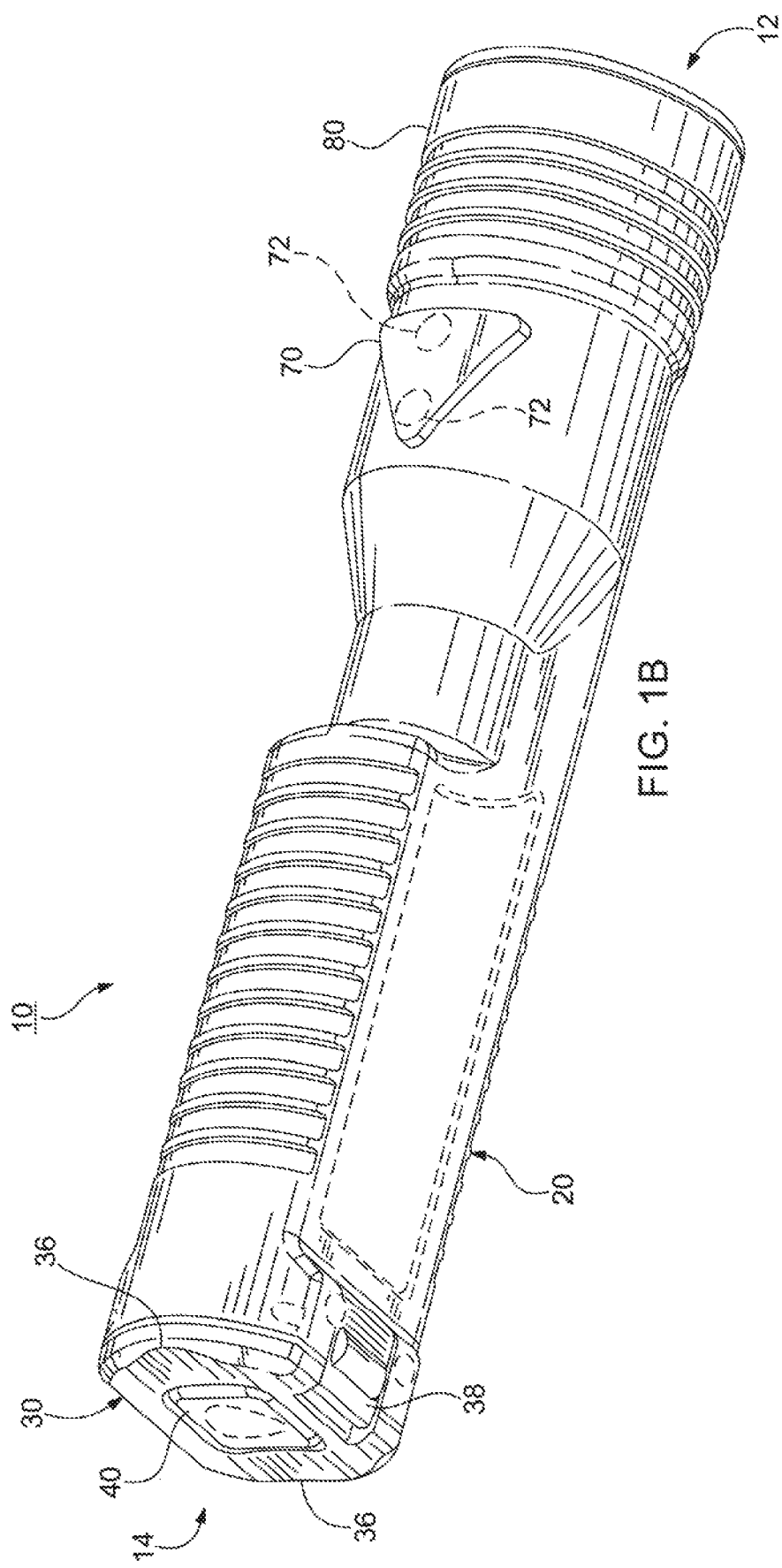

FIGS. 1A and 1B are first and second perspective views of an example embodiment of a hand holdable light; FIGS. 2A, 2B, 2C and 2D are four different views of the example hand holdable light being gripped by a hand in four different ways; FIGS. 3A through 3D are four side views of the example hand holdable light in different rotational positions, and FIGS. 3E and 3F are end views thereof.

Light 10 includes a light body 20 having a forward end 12 or head end 12, from which light is typically emitted, and a rearward end 14 or tail end 14. Light body 20 typically supports a light source 90 at or near the forward end 12 thereof for directing light in a generally forward direction, whether the light is formed in to a relatively narrow or spot beam or into a relatively broader wide or flood beam, or is changeable between relatively narrower and relatively wider beam widths.

Example light body 20 includes, e.g., a light housing 22 or body housing 22 having a face cap 82 and/or reflector 80 at a forward end 12 thereof and a cover 30 or tail cap 30 at a rearward end 14 thereof.

Light source 90 in modern lights typically includes one or more light emitting diodes (LEDs), but may alternatively or additionally include a filament lamp or other light source. While light therefrom is often directed in a generally forward direction, it may be directed at an angle relative to a longitudinal axis of light 10 and/or light head 80 may be set at an angle relative to the longitudinal axis and/or may pivotable so that a user may change the direction in which light is emitted over a range of angles.

Light body 20 typically has a cover 30, typically referred to as a tail cap 30, at its rear end 14 which can be opened and closed for placing a source of electrical power, e.g., a battery, inside of light body 20 and/or for removing a battery from inside of light body 20. Example tail cap 30 is hinged so as to swing open and has a latch 38 to retain it in a closed position against the rear end of light body housing 22 to cover the opening at the rear end thereof. A source of electrical power, e.g., a battery, may include one or more separate battery cells or a battery assembly for carrying one or more battery cells. A battery assembly 100 may be covered or sheathed so as to retain the battery cells therein or may be unsheathed so as to permit user placement, removal and replacement of one or more battery cells therein.

Example light 10 includes one or more actuators 40, 50, 60 on its exterior that may be, e.g., pressed inwardly or slid laterally or otherwise moved, for actuating (operating) a corresponding electrical switch within light 10 which operates the light 10, e.g., turns light source 90 ON, either momentarily or continuously, and OFF. In general, other modes of light source 90 may be enabled by actuating one or more of actuators 40, 50, 60 in a given manner or sequence, or a given number of times, or for given periods of time, or a combination thereof, for actuating various modes, e.g., dimming, un-dimming, flashing, blinking, strobing, and the like, and/or for selecting one of plural light sources to operate. Thus, the plural operating modes of light 10 are selectable by a user.

Regarding the example light 10, however, the principal function of actuators 40 and 50 is to control the turning ON and OFF of light source 90 while actuator 60 principally functions as a mode selector for selecting ones of the operating modes of operation of light 10 to be controlled via actuators 40, 50. In a preferred arrangement, actuators 40, 50 operate in like manner, e.g., if light 10 is OFF, pressing either actuator 40 or actuator 50 part way in causes light source 90 to turn ON momentarily, e.g., only while such actuator remains partially pressed, and to turn OFF when such actuator is released.

Similarly, e.g., if light 10 is OFF, pressing either actuator 40 or actuator 50 all the way and releasing it (sometimes called a single "click") causes light source 90 to turn ON and to remain ON when such actuator is released, e.g., single click to turn ON and single click again to turn OFF. Double clicking either actuator 40 or actuator 50 causes light source 90 to operate, e.g., in a strobing mode, and then single click to turn OFF.

In the preferred arrangement, actuator 60 is slidable transversely to light body 20 to be in each of plural positions, e.g., in one of three positions corresponding to low, medium and high brightness or intensity of light source 90, and may be operated to change positions when light 10 is ON and when it is OFF.

Actuator 40 is disposed at the rear end 14 of light 10 and actuators 50 and 60 are disposed along a side of light 10 toward the forward end 12 thereof, and in specific locations relative to the various parts 20F, 20C and 20R for enabling an ergonomic grip arrangement as is described below.

When light 10 is intended to employ a rechargeable source of electrical power, e.g., a rechargeable battery, a charging interface 70 is provided on the exterior of light 10. In the example light 10, charging interface 70 includes a generally triangular guide for facilitating light 10 having a predetermined orientation relative to a charger when placed into such charger. Guide 70 is typically attached to body 20 of light 10 by two screws 72 which also serve as electrical contacts for connecting to corresponding contacts in a suitable charger when light 10 is placed therein. Guide 70 is preferably located toward the forward end 12 of light 10, e.g., peripherally opposite to actuators 50, 60, and preferably sufficiently forward as to not be touched by the fingers of a typical user holding light 10.

Examples of the charging interface and compatible charger may be found in U.S. Pat. No. 7,220,013 entitled "Rechargeable Flashlight and Battery Assembly for Single- Handed Intermittent and Continuous Operation" issued to Raymond Sharrah et al on May 22, 2007, which is assigned to Streamlight, Inc., and in U.S. Pat. No. 5,432,698 entitled "Flashlight and Recharging System Therefor" issued to Raymond Sharrah et al on Jul. 11, 1995, which is also assigned to Streamlight, Inc., each of which is hereby incorporated herein by reference in its entirety.

Example light body 20 has a forward portion 20F toward the head end 12 thereof, a rearward portion 20R toward the rear end 14 thereof, and a central portion 20C therebetween. Various aspects of forward portion 20F, central portion 20C and rearward portion 20R are arranged for providing a gripping region and configuration that is suitable for being gripped by a user in several different ways, while accommodating a range of sizes of human hands. The illustrated rearward portion 20R is illustrated as having a plurality of partial circumferential ribs or ridges which tend to improve a user's grip thereof, however, such ridges are by way of example only and may be omitted or replaced by other grip-improving features, e.g., knurling, roughening, a frictional, e.g., rubber-like, coating, and the like.

While portions 20F, 20C, 20R do extend over a substantial part of the length of the illustrated example light 10, they need not do so, e.g., where a light 10 is longer than the illustrated example, or may extend over the entire length, e.g., where light 10 is shorter. For example, if a light 10 were to employ a longer battery, then the length of the rear part of housing 22 that encloses the battery would be lengthened as would rear portion 20R so that a suitable grip would be provided for using both the forward actuators 50, 60 and the rear actuator 40. In addition, the locations of portions 20F, OC, 20R along the length of housing 22 may be moved forward or rearward as may be desirable for maintaining a good balance or "feel" of the light 10 in a user's hand.

Figure 2A:
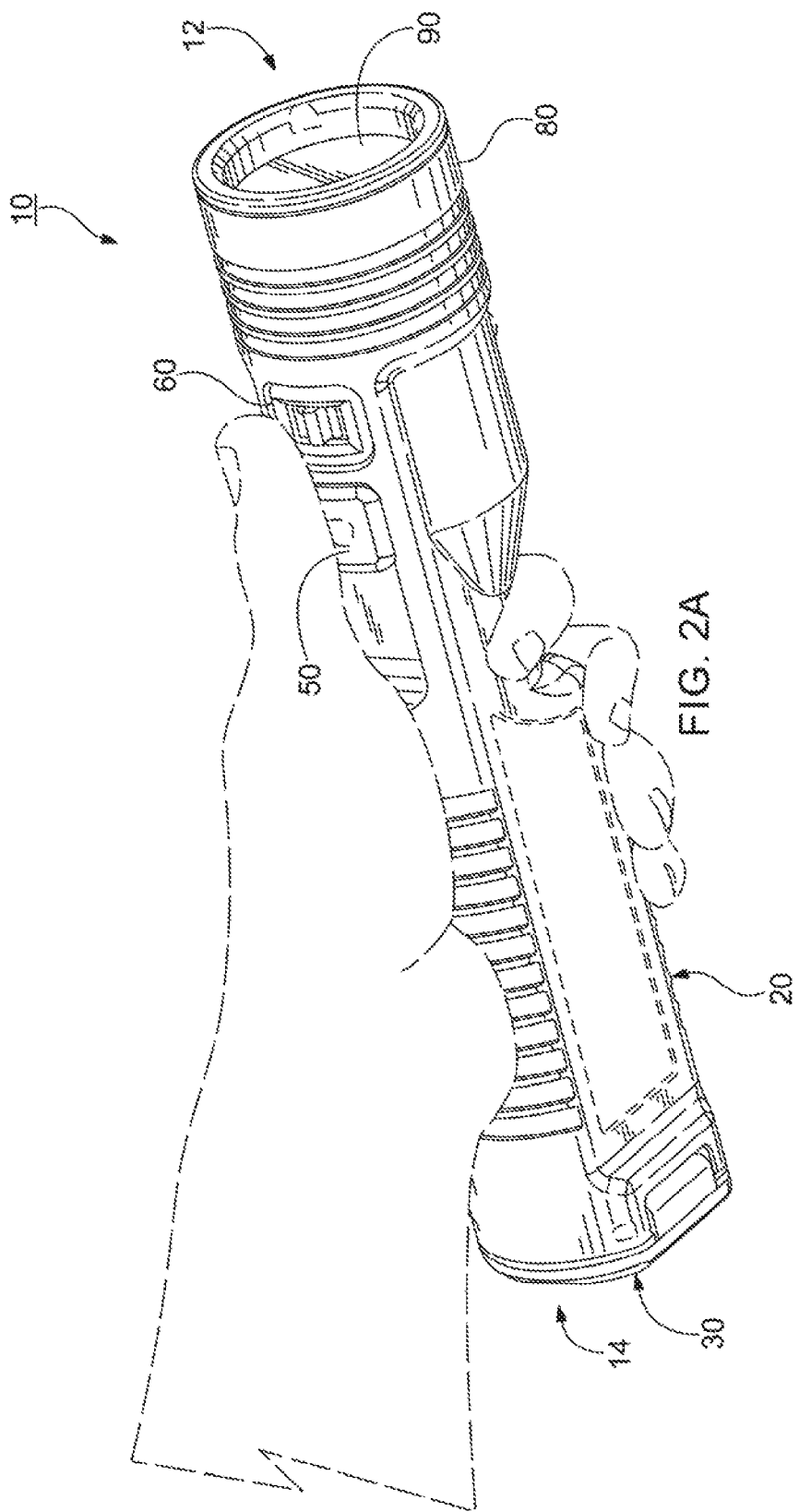
FIGS. 2A, 2B, 2C and 2D are four different views of the example hand holdable light being gripped by a hand in four different ways.
Figure 2B:
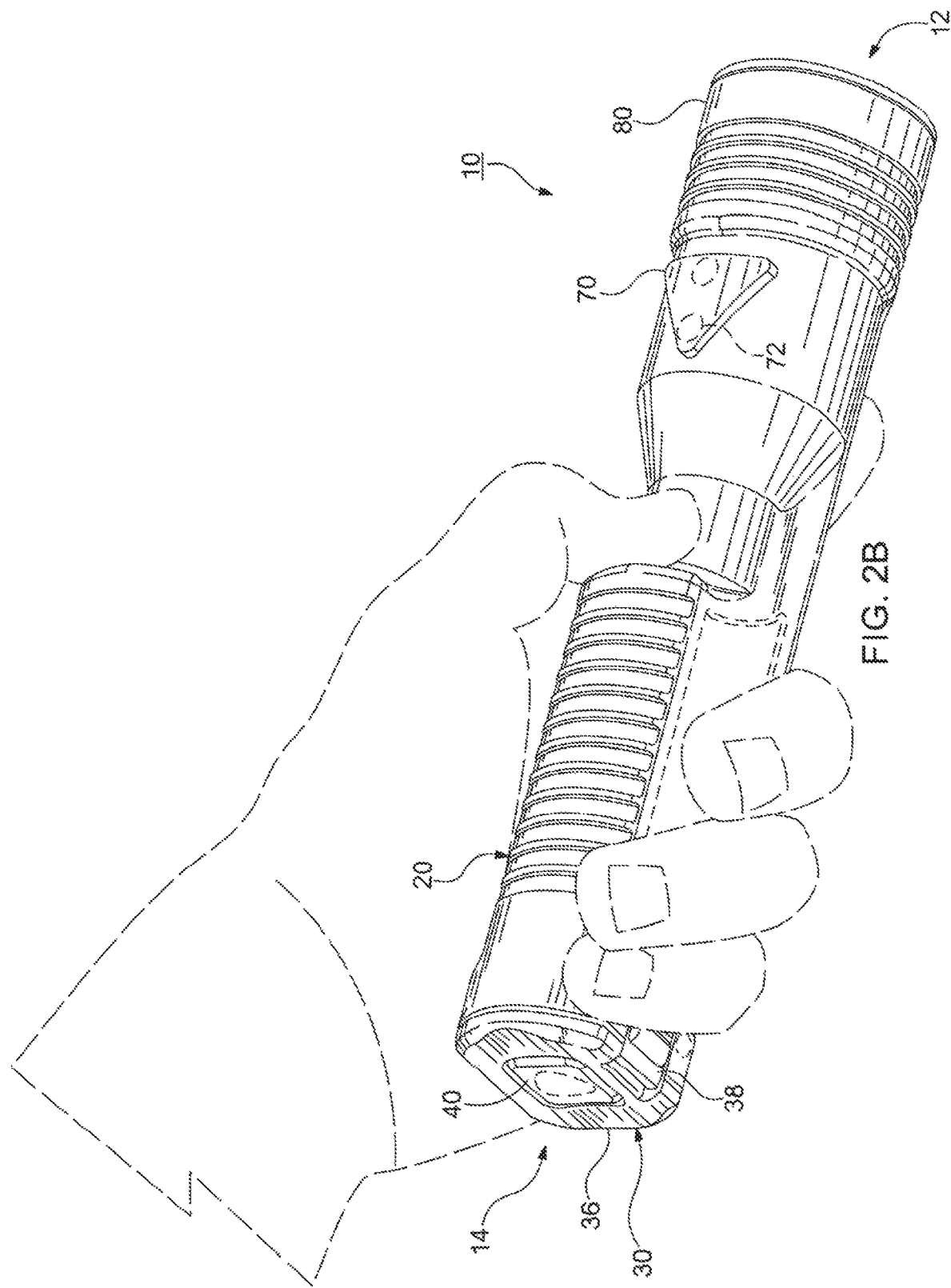
Figure 3A:
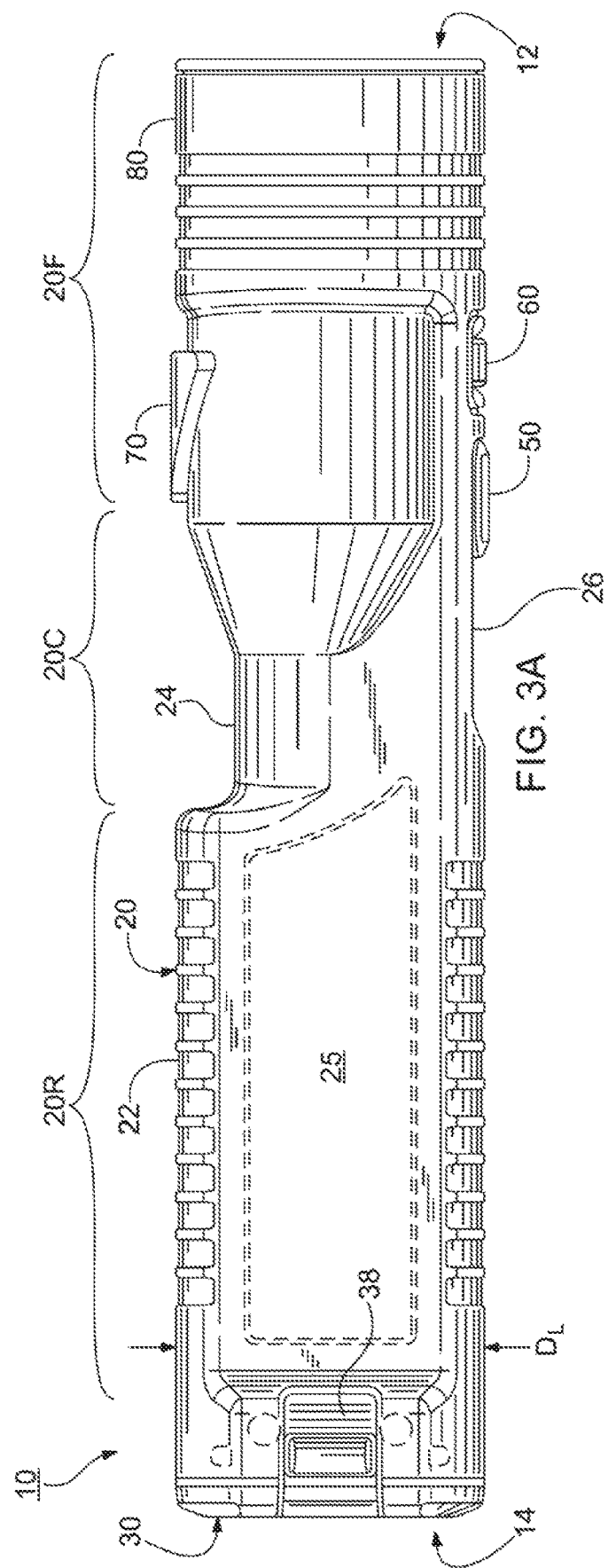
FIGS. 3A through 3D are four side views of the example hand holdable light in different rotational positions and FIGS. 3E and 3F are end views thereof.
Figure 3B:
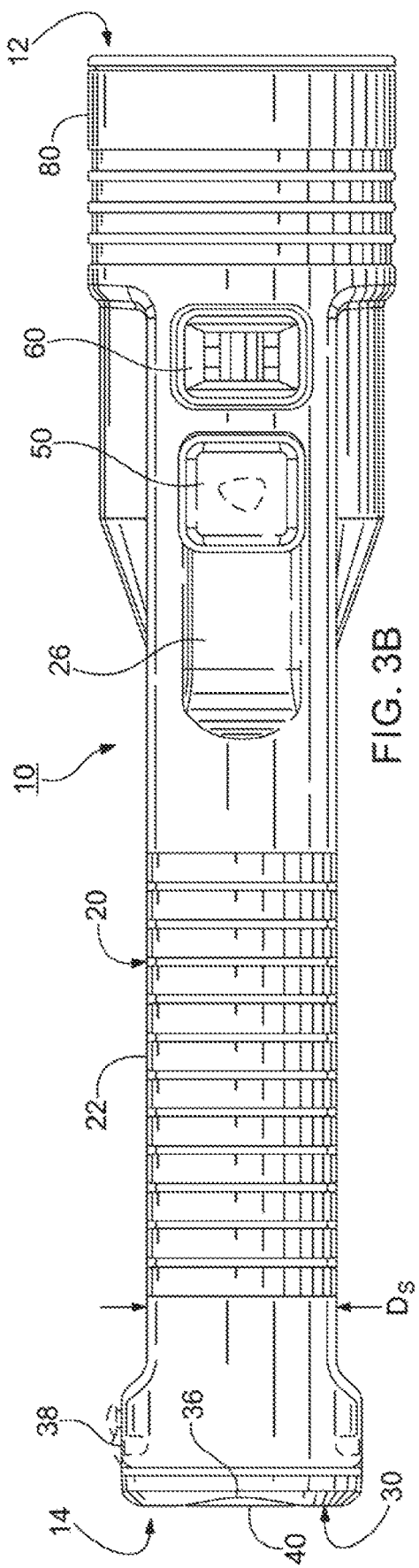
Figure 3C:
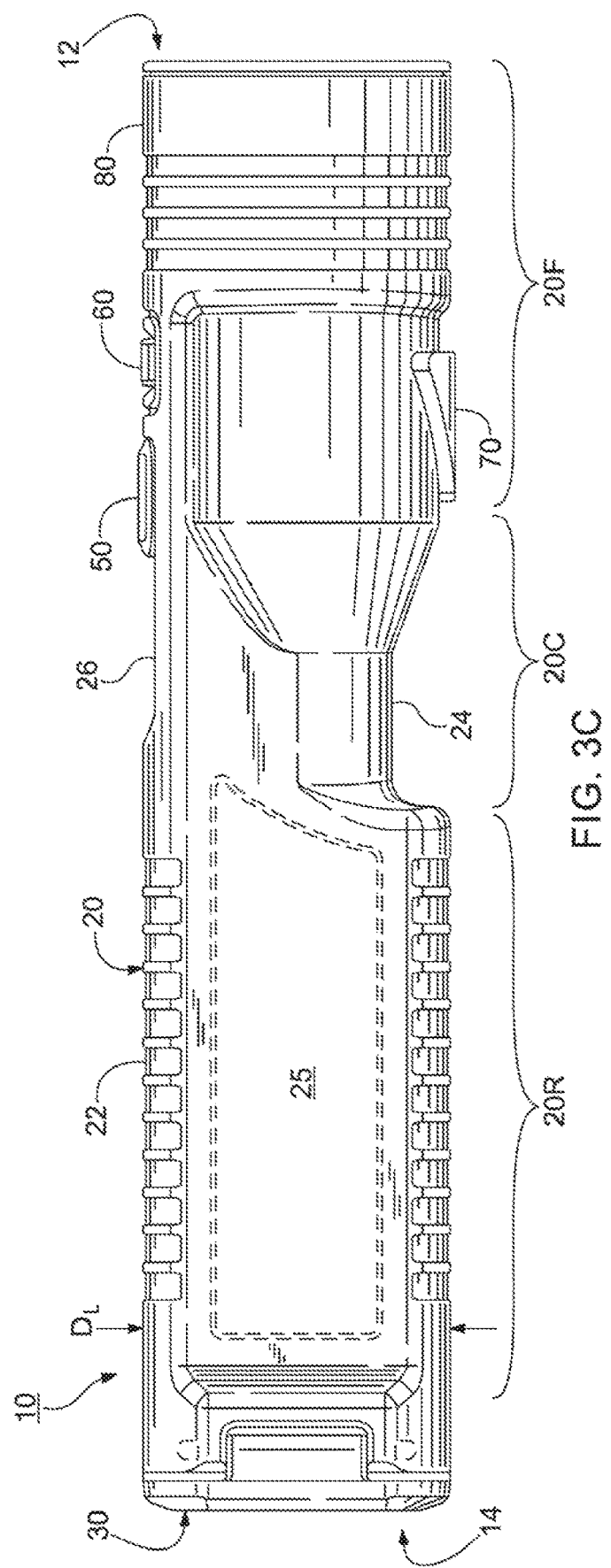
Figure 3D:
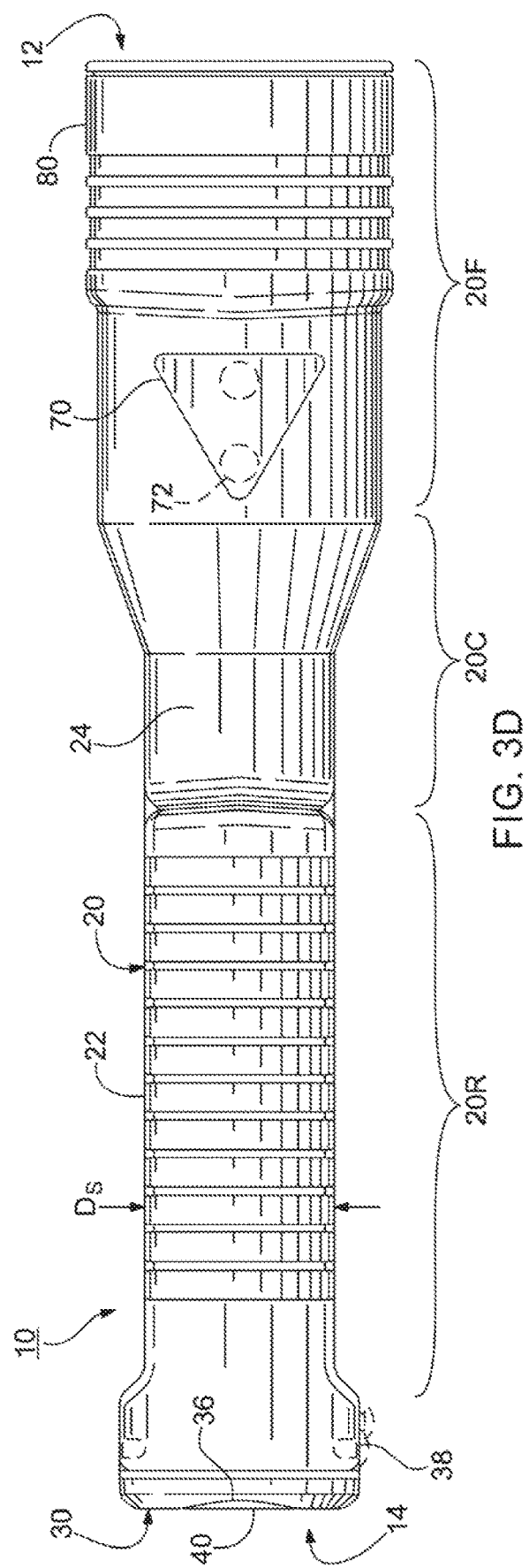
Figure 3F:
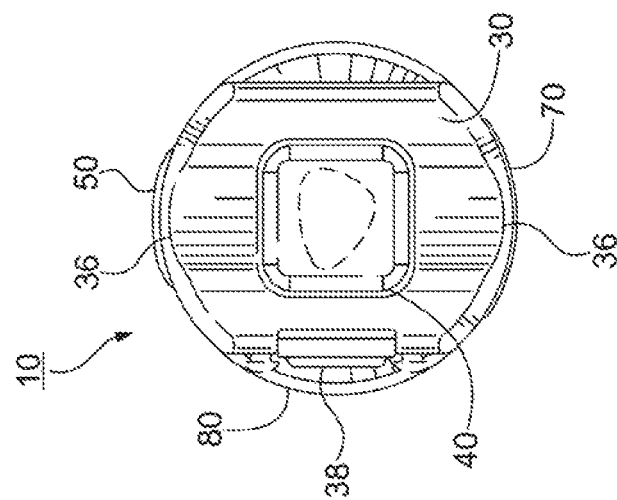
Figure 3E:
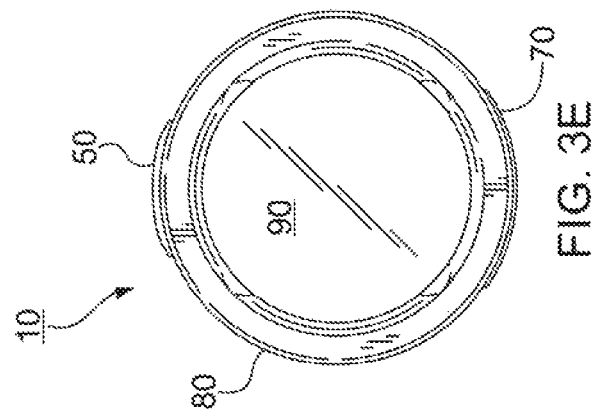

In FIGS. 2A and 2B are illustrated ways of gripping light 10 in which, e.g., a user's arm may hang downward along the user's side. In both the users had grasps light 10 primarily with its palm and fingers wrapped around rear portion 20R with the thumb and forefinger extending along light 10 toward the forward end 12 thereof. It is noted that the non-symmetrical shape of central portion 20C coupled with the natural tendency of either the thumb or forefinger to rest in the recess thereof and the other of the thumb and forefinger to rest against one of actuators 50, 60 serve to provide the user tactile feel enabling rapid determination of the orientation of light 10 and the gripping of light 10 in a known desired orientation, e.g., for directing light in front of the user.

In FIG. 2A light 10 is oriented with actuators 50, 60 upward so that the user's thumb is in a position from which it can easily be used to actuate actuators 50 and/or 60 and the user's forefinger can rest in the recess of central portion 20C. In FIG. 2B light 10 is oriented with actuators 50, 60 downward so that the user's forefinger is in a position from which it can easily be used to actuate actuators 50 and/or 60 and the user's thumb can rest in the recess of central portion 20C.

Figure 2C:
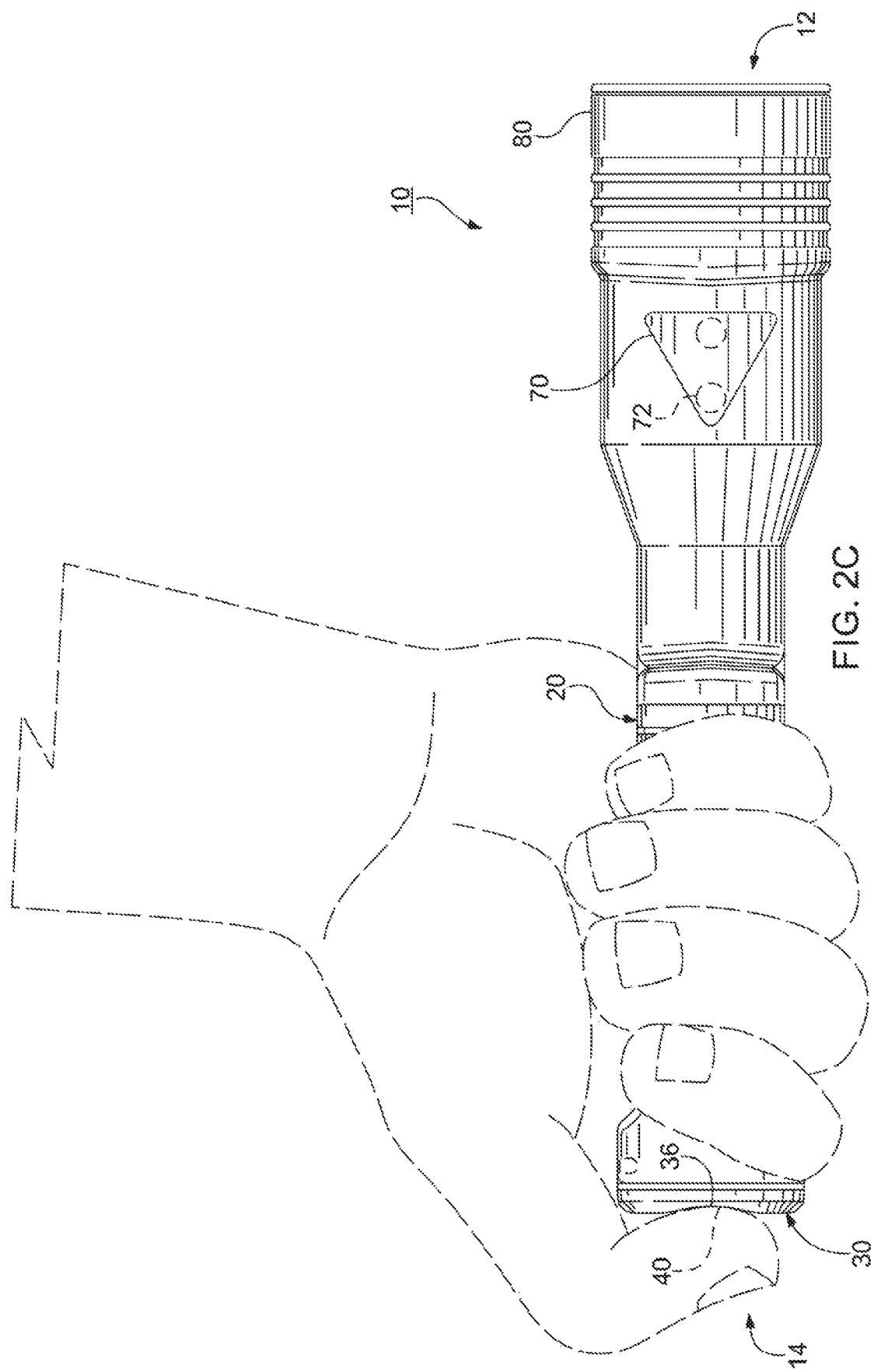
Figure 2D:
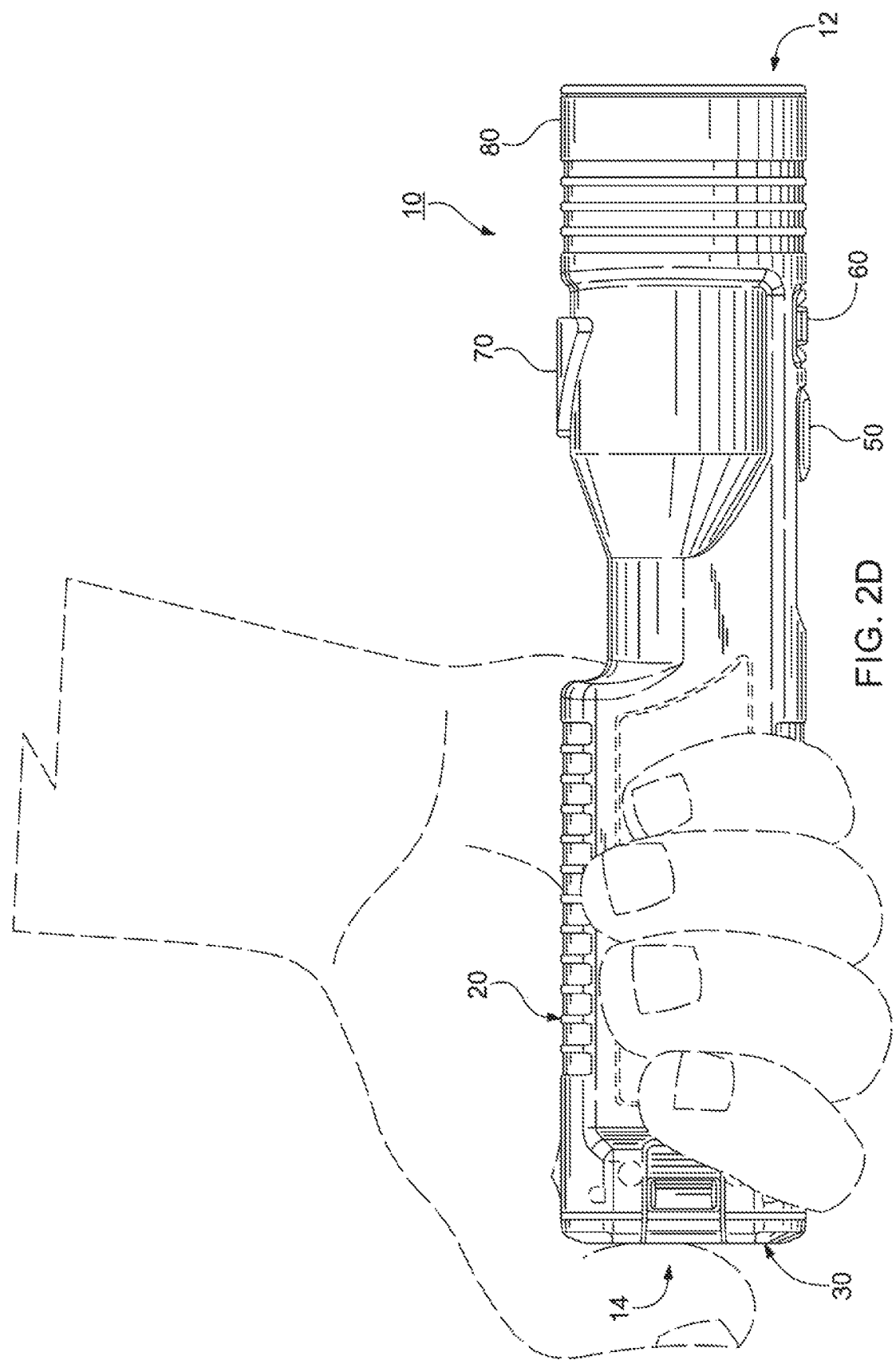

In FIGS. 2C and 2D, light 10 is also gripped with the user's palm and fingers around rear portion 20R of light 10, but with light 10 oriented so that the user's thumb rests against or near actuator 40 on tail cap 30. When held with the user's elbow bent and forearm upward, light 10 is oriented for directing light, e.g., in front of the user, as is usually desired. Preferably a transverse shallow groove 36 is provided on tail cap 30, and actuator 40 is disposed in that groove 36, so as to assist a user by tactile feel to position his thumb to be on or near to actuator 40, and either aligned with or transverse to groove 36, as may be desired and/or comfortable for each user.

Rearward portion 20R of light body 20 preferably has a flattened shape, e.g., a flattened cylindrical shape, an oval shape, an elliptical shape or the like, so that it can be grasped comfortably by a user wrapping his hand around rearward portion 20R, most likely with one of the flattened sides thereof adjacent the palm of the user's hand, e.g., as illustrated. Rearward portion 20R may thus be described as having a relatively larger or major transverse dimension $D_L$ and a relatively smaller or minor transverse $D_S$ dimension. The relatively larger or major transverse dimension $D_L$ may be referred to as being in a major direction relative to light body 20 and the relatively smaller or minor transverse $D_S$ dimension may be referred to as being in a minor direction relative to light body 20.

One or both of the flattened portions of housing 22 may have a region 25 thereon which may be configured to provide an improved grip 25, e.g., as by having a textured or knurled surface 25, or by having a pattern in or on grip 25, or by having a coating or sheet 25 of textured and/or frictional material, e.g., a shaped sheet 25 of rubberized material adhered to region 25. The pattern, coating and/or sheet material on one or the other or both of the grips 25 of opposing broad surfaces preferably has higher coefficient of friction than does the surface when smooth and/or uncovered, thereby to tend to enhance a user's grip on light 10.

Alternatively and/or additionally and/or optionally, one or both of regions 25 of flattened portions 25 of housing 22 may contain information for a user, e.g., information printed on region 25, or made by raised or recessed characters thereon, or made in or on a coating or material thereon, or information on a label 25 applied thereto.

In one example light 10, rearward portion 20R extends for approximately one half of the length of light 10, e.g., as illustrated, however, it may be shorter, e.g., one-third of the length or less, or longer, e.g., more than one-half the length. In general, the length of rearward portion 20R may approximate the width of a typical human hand, and my possibly be sized towards the width of a larger human hand where the size of light body 20 permits.

Forward portion 20F preferably has a dimension in the major direction that is approximately that of the major dimension $D_L$ of rearward portion 20R, but may be substantially larger or smaller than dimension $D_L$, and has a convenient cross-sectional shape. Any cross-sectional shape that does not interfere with a comfortable human grip should generally be acceptable, and the illustrated example embodiment has a substantially cylindrical shape in its forward portion 20F.

In one example light 10, forward portion 20F extends for approximately one quarter of the length of light 10, e.g., as illustrated, however, it may be shorter, e.g., less than one-quarter of the length or less, or longer, e.g., more than one-third to one-half the length. In general, the length of forward portion 20F may approximate the length of the end of a typical human finger, and may possibly be sized towards the length of a larger or smaller human finger where the size of light body 20 permits.

Central portion 20C preferably has a dimension in the major direction that is smaller than that of the major dimension $D_L$ of rearward portion 20R and may be smaller than dimension $D_L$, and has a convenient cross-sectional shape. Central portion 20C preferably has a recess in the side thereof closest to charger guide 70. In a preferred arrangement, the side of central portion 20C, the side of rear portion 20R and the side of forward portion 20F along which are disposed actuators 50 and/or 60 are substantially in a line with each other. The dimension of central portion 20C in the minor direction may be approximately the same as smaller dimension $D_S$ of rear portion 20R, but may be larger or smaller. Any cross-sectional shape that does not interfere with a comfortable human grip, e.g., of a user's forefinger and/or thumb, should generally be acceptable for central portion 20C, and the illustrated example embodiment has a substantially cylindrical shape or a flattened cylindrical shape in its forward portion 20F, the curvature of which is compatible with the curvature of a user's bent finger.

In one example light 10, central portion 20C extends for approximately one quarter of the length of light 10, e.g., as illustrated, however, it may be shorter, e.g., less than one-quarter of the length or less, or longer, e.g., more than one-third of the length. In general, the length of central portion 20C may approximate the width of the of one or two typical human fingers, and may possibly be sized towards the width of a relatively larger human finger where the size of light body 20 permits.

The exterior surface of central portion 20C that extends along housing 22 from one relatively narrow side of rear portion 20R towards actuators 50, 50 is preferably substantially the same shape as is that side of rear portion 20R and is generally aligned therewith. Central portion 20C preferably has a substantially smaller transverse dimension in the direction of major dimension $D_L$ than does rear portion 20R. Thus the surface of central portion 20C that is opposite to actuators 50, 60 and along the side of housing 22 upon which is disposed guide 70 preferably defines a recess 24 that is sized for receiving one or two fingers of a user, e.g., when a user holds the light 10 as illustrated in FIG. 2A. Recess 24 preferably has a dimension in the longitudinal direction of light 10 that is about 1-2 inches (about 2.5-5 cm), e.g., about 1.5 inches (about 3.75 cm) in the example illustrated, for receiving a user's finger or two, and may have a depth radially of up to about 1 inch (about 2.5 cm), e.g., typically about 0.3 inch (about 0.75 cm) in the example illustrated. The ends of recess 24 may be sloped into recess 24 and/or may be curved for providing, e.g., a comfortable shape for a user when holding light 10.

In addition to the foregoing advantageous combinations of shape and size of light body 20 and of various parts thereof, tail cap 30 preferably has a relatively shallow transverse groove 36 on the broad exterior surface thereof that is aligned with the major dimension of housing 22. Actuator 40 is preferably disposed in the transverse groove 36 thereby to guide a user's thumb placed against tail cap 30, e.g., as illustrated in FIG. 2C, towards actuator 40. Accordingly, groove 36 may be approximately as wide as a typical thumb, e.g., about 0.8-1.25 inch (about 2-3 cm), e.g., typically about 0.6 inch (about 1.5 cm) in the example illustrated, may be up to about 0.2 inch (up to about 0.5 cm) deep, typically about 0.05 inch (about 0.13 cm) in the example illustrated, and may extend from side-to-side across the rear surface of light body 20 that is provided by tail cap 30.

Similarly, housing 22 preferably has a relatively shallow longitudinal groove 26 along the exterior surface thereof upon which actuators 50, 60 are disposed, e.g., aligned longitudinally along the relatively narrower side thereof which is at one end of the major dimension $D_L$ of housing 22. Actuators 50, 60 are preferably disposed in the transverse groove 26 thereby to guide a user's thumb placed against housing 22, e.g., as illustrated in FIG. 2A, towards actuators 50, 60. Accordingly, groove 26 may be approximately as wide as a typical thumb, e.g., about 0.4-1.25 inch (about 2-3 cm), e.g., typically about 0.5-0.6 inch (about 1.4-1.5 cm) in the example illustrated, may be up to about 0.2 inch (up to about 0.5 cm) deep, e.g., typically about 0.05 inch (about 0.13 cm) in the example illustrated, and may be about as long as the end of a typical thumb, e.g., up to about 1.6 inches (up to about 4 cm).

The combination of the respective shapes and lengths and relative positions of rear portion 20R, central portion 20C and forward portion 20F together tend to provide a shape of light body 20 that is easily and comfortably gripped by the hands of most users, and provides a tactile feel that facilitates a user gripping the light in a known orientation. In addition, the locations of switch actuators 40, 50 and 60 on light body 20 relative to gripping portions 20R, 20C, 20F facilitate a user operating light 10 based upon tactile feel and a natural movement of the user's finger and/or thumb. Further, the locations, orientations and sizes of grooves 26, 36 also assist a user in guiding his thumb into proximity with the actuators 40, 50 and/or 60.

The foregoing examples of dimensions and of ranges thereof are examples that are believed to be consistent with an example light that has, e.g., a length of about 7.7 inches (about 13.6 cm), a major dimension $D_L$ of about 1.6 inches (about 4.1 cm), a minor dimension $D_S$ of about 1.0 inch (about 2.5 cm) and a head diameter of about 1.6 inches (about 4.1 cm). Light 10 may have dimensions that are larger and/or smaller than these examples as may be suited, e.g., to an intended application and/or to ranges of hand sizes.

Figure 4A:
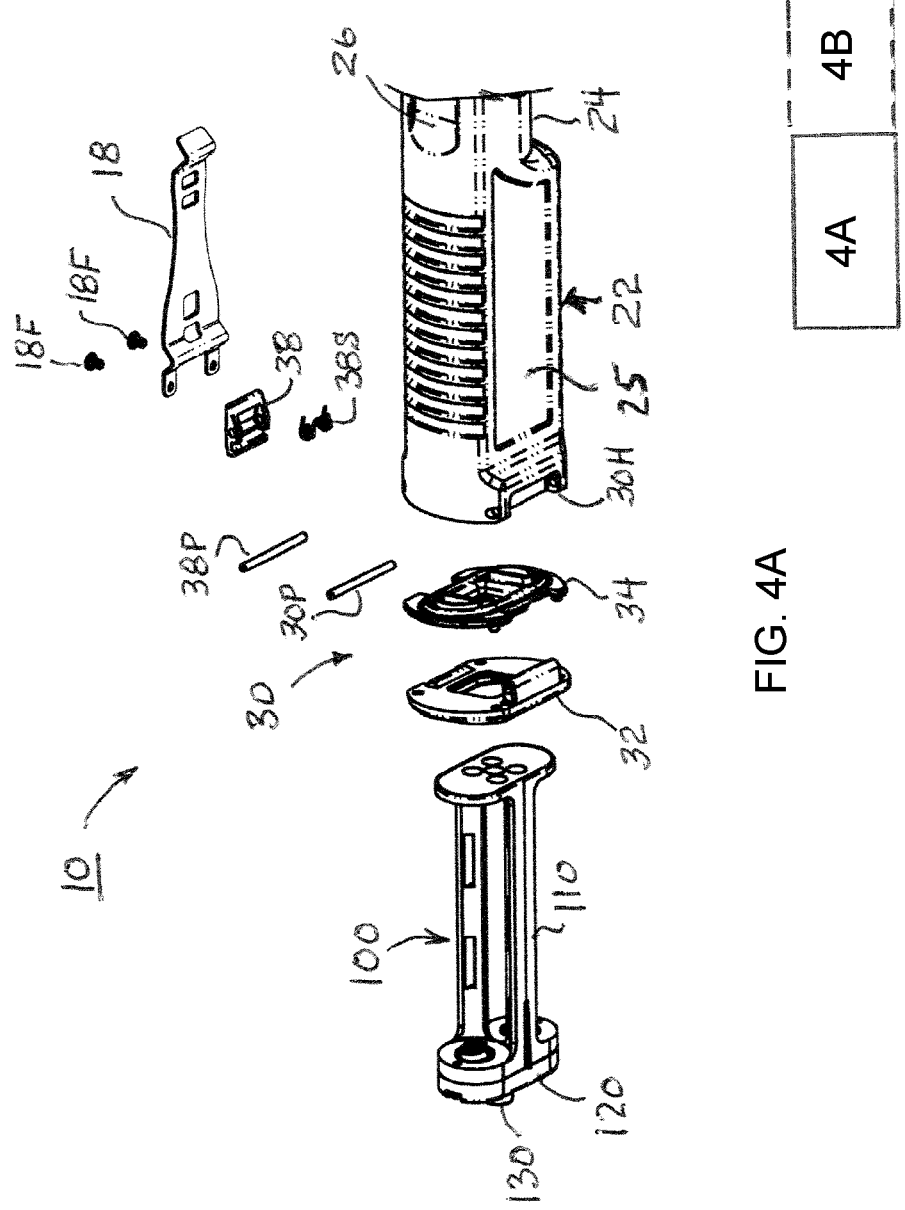
FIGS. 4A and 4B are together an exploded view of the example hand holdable light and FIG. 4C is a longitudinal cross-sectional view thereof.
Figure 4A:
Figure 4B:
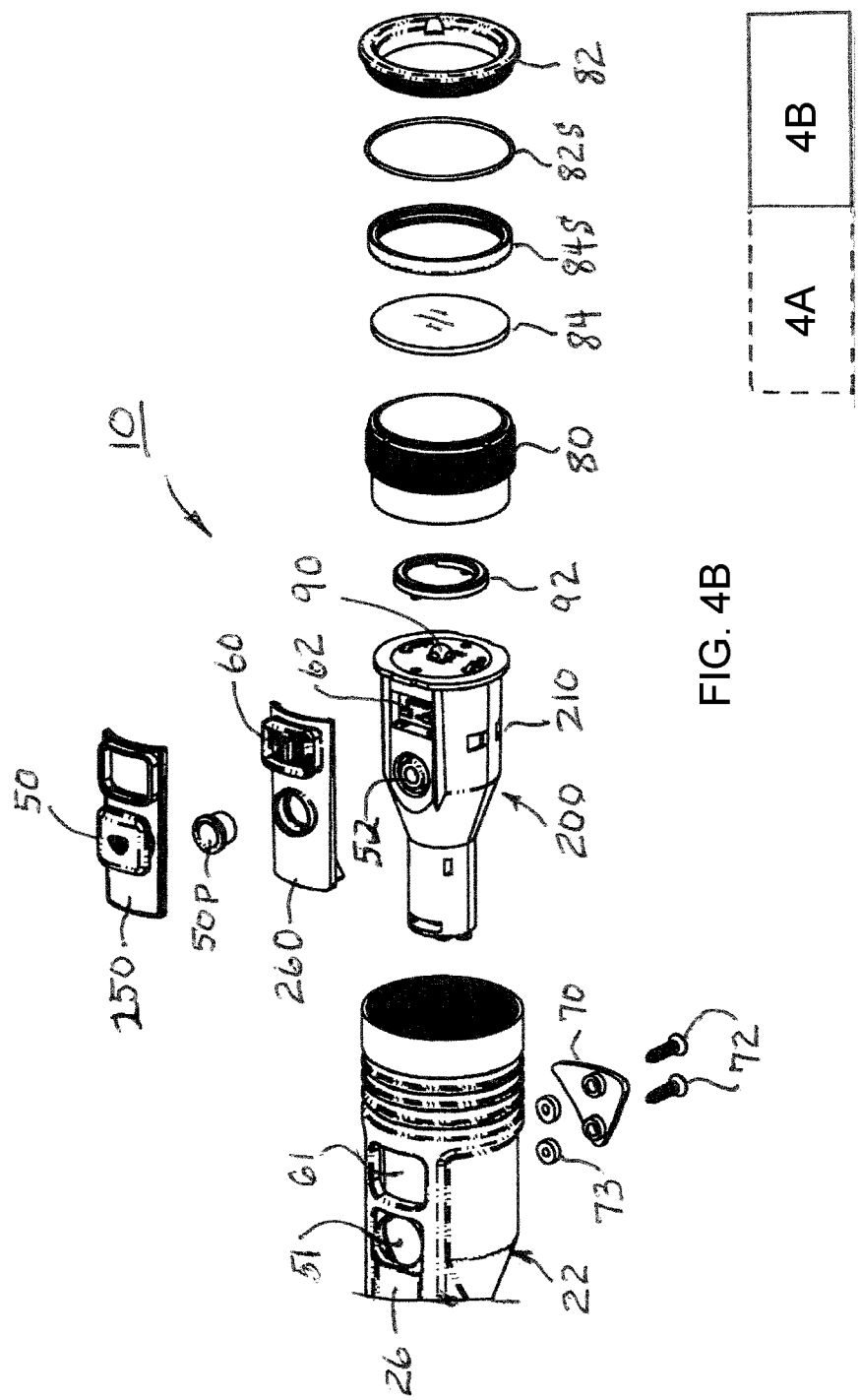
Figure 4C:
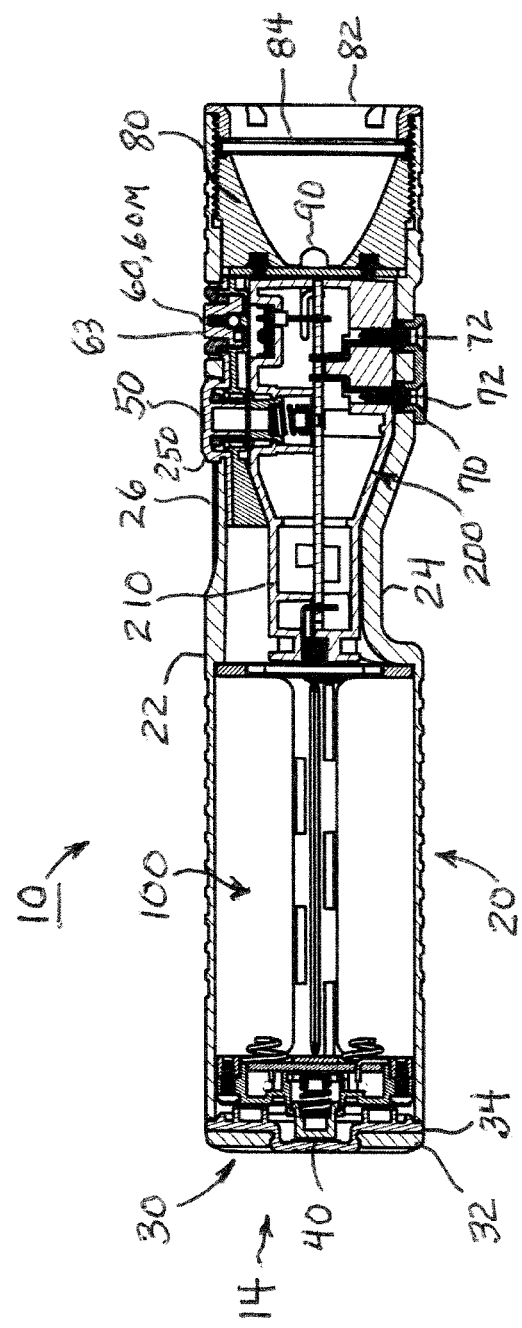

FIGS. 4A and 4B are together an exploded view of the example hand holdable light 10 covering two drawing sheets that together comprise a single exploded view, and FIG. 4C is a longitudinal cross-sectional view thereof. An example battery assembly 100 carries one or more sources of electrical power, e.g., one or more battery cells, as described below, and is placed into and removed from light body 20 through an opening in the rearward end of housing 22 thereof, when tail cap 30 thereof is opened to expose the opening.

The rearward end 14 of housing 22 of light 10 has a tail cap or cover 30 comprising a tail cap body 32 having a central opening and a tail cap seal 34 of substantially the same size and shape as tail cap 30, and of the rearward end of housing 22, so as to provide a seal therefor. Tail cap seal 34 has a raised portion or dome 40 in its central region that extends onto or through the central opening of tail cap body 32, or that is accessible through such opening, to provide an exterior feature 40 that is an exterior actuator 40 for an electrical switch 130 interior to light 10, e.g., which in example light 10 is associated with battery assembly 100, and is not part of tail cap 30.

Tail cap 30 preferably is a cover 30 that is pivotably attached to the rear of housing 22 by a hinge pin 30P that is disposed through respective openings in housing 22 and tail cap 30. Tail cap 30 is retained in its closed position against the rearward end of housing 22 by a latch 38 that is pivotably attached to the rear of housing 22 by a hinge pin 30P that is disposed through respective openings in housing 22 and latch 38. Latch 38 may be biased by one or more springs 38S towards housing 22 to engage a latching feature, e.g., a projection or recess or other feature of cover 30, and may be a loop 38 or clasp 38 or other shape configured to engage the latching feature of cover 30.

The forward end of example light 10 holds a module assembly 200 that is placed into housing 22 through an opening at the forward end 12 thereof, and that is shaped with a reduced diameter rearward end so as to substantially follow the interior shape of the forward portion 20F and central portion 20C of housing 22. Reflector 80 is threaded into housing 22 to be adjacent to module assembly 200 in housing 22 and provides a reflector for light source 90. Centering disk 92 is disposed adjacent light source 90 for centering light source 90 with reflector 80. Lens 84 is surrounded by a circular seal 84S having a U-shaped cross-section and is disposed within reflector 80, and is retained therein by O-ring 82S and threaded lens retainer ring 82 which threads into or onto reflector 80. O-ring 82S may be configured to serve as a seal and/or as a shock absorber.

Module assembly 200 includes a module housing 210 supporting a light source 90 at a forward end thereof and has one or more battery contacts at a rearward end thereof. Electrical switches 52, 62 along the side thereof are positioned to be aligned with openings 51, 61 of housing 22, e.g., in shallow recess 26 thereof. Bezel 260 fits against module assembly 200 to cover electrical switches 52, 62 thereof and a flexible boot 250 disposed between the inside of housing 22 and bezel 250 provides a housing seal and actuator 50 which is accessible through opening 51. Plunger 50P is disposed between actuator 50 of boot 250 and switch 52.

Module assembly 200 is retained inside housing 22 by fasteners 72 which pass through openings in guide 70 that align with holes in module 200 in which they engage respective conductors for making electrical connections between the external charging contacts 72 provided by the external ends of fasteners 72 and electrical circuits on a circuit board within module assembly 200. Insulators 73 prevent fasteners 72 from touching and possibly making an unwanted electrical connection to housing 22, which may be made of an electrically conductive material; insulators 73 may also provide a seal.

Bezel 260 includes an opening that tends to guide plunger 50P to move in a generally radial direction toward and away from switch 52 and actuator 60 thereof includes a slide 63 that is retained thereto and moves therein transversely to the longitudinal direction of light 10 between two or more predetermined positions in which it tends to be retained by a detent provided by a ball and spring beneath actuator 60 that are visible in FIG. 4C.

Slide 63 preferably also includes a magnet that is proximate to module assembly 200, e.g., circuit board 64 thereof. The magnetic field of the magnet is detected by one or more magnetic detectors 62 that are disposed in module assembly 200, e.g., for detecting the position of slide 63 in bezel 260 to cause light 10 to operate in a particular operating mode that is related to the position of slide 63 in bezel 260. In one example embodiment, the operating mode includes the brightness or intensity of the light produced by light 10.

An optional clip 18 may be provided for facilitating a user attaching light 10 to an article of clothing or equipment, or to another object. Clip 18 is attached to housing 22 by one or more fasteners 18F, e.g., screws 18F, at a convenient location on housing 22. Clip 18 is typically made of a springy material, e.g., a steel, spring steel, beryllium copper, or the like, and is formed so that the end thereof distal from fasteners 18F either bears against housing 22 or very nearly bears against housing 22. Clip 18 may have one or more openings, e.g., for attaching a lanyard, ring or other accessory, and/or by which light 10 may be attached to a complementary mounting device that engages an opening in clip 18.

Figure 5C:
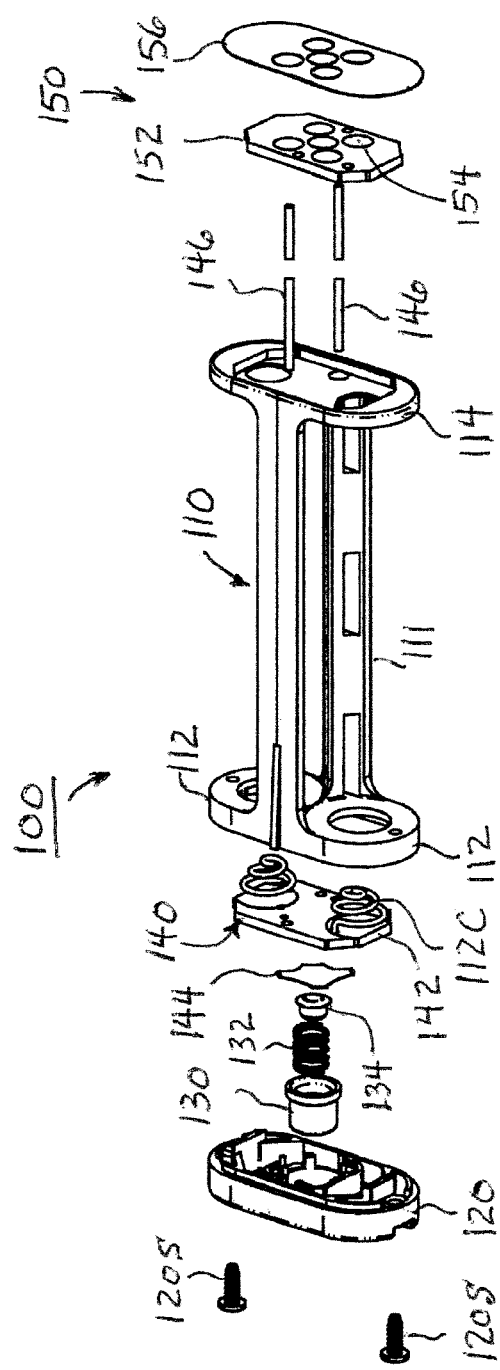
FIG. 5C is an exploded view thereof.
Figure 5D:
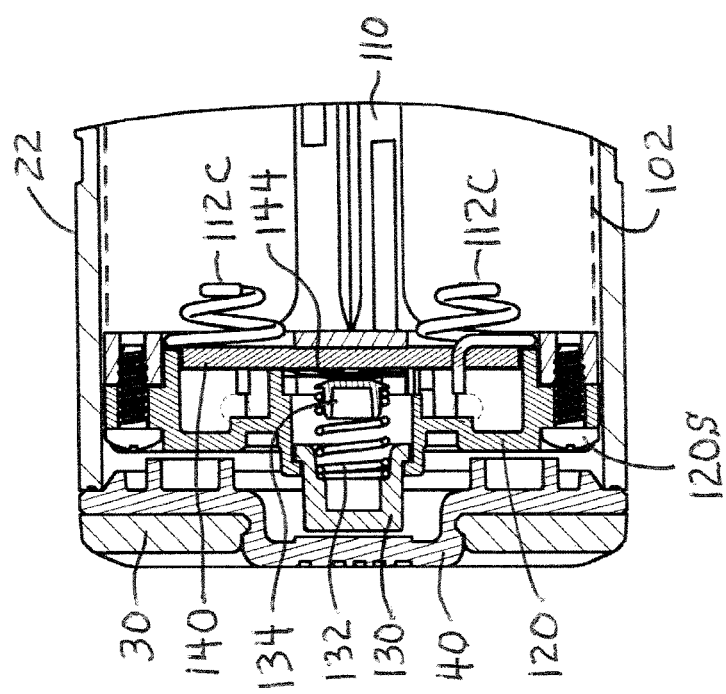
FIG. 5D is an enlarged view of the end thereof including a switch.
Figure 5E:
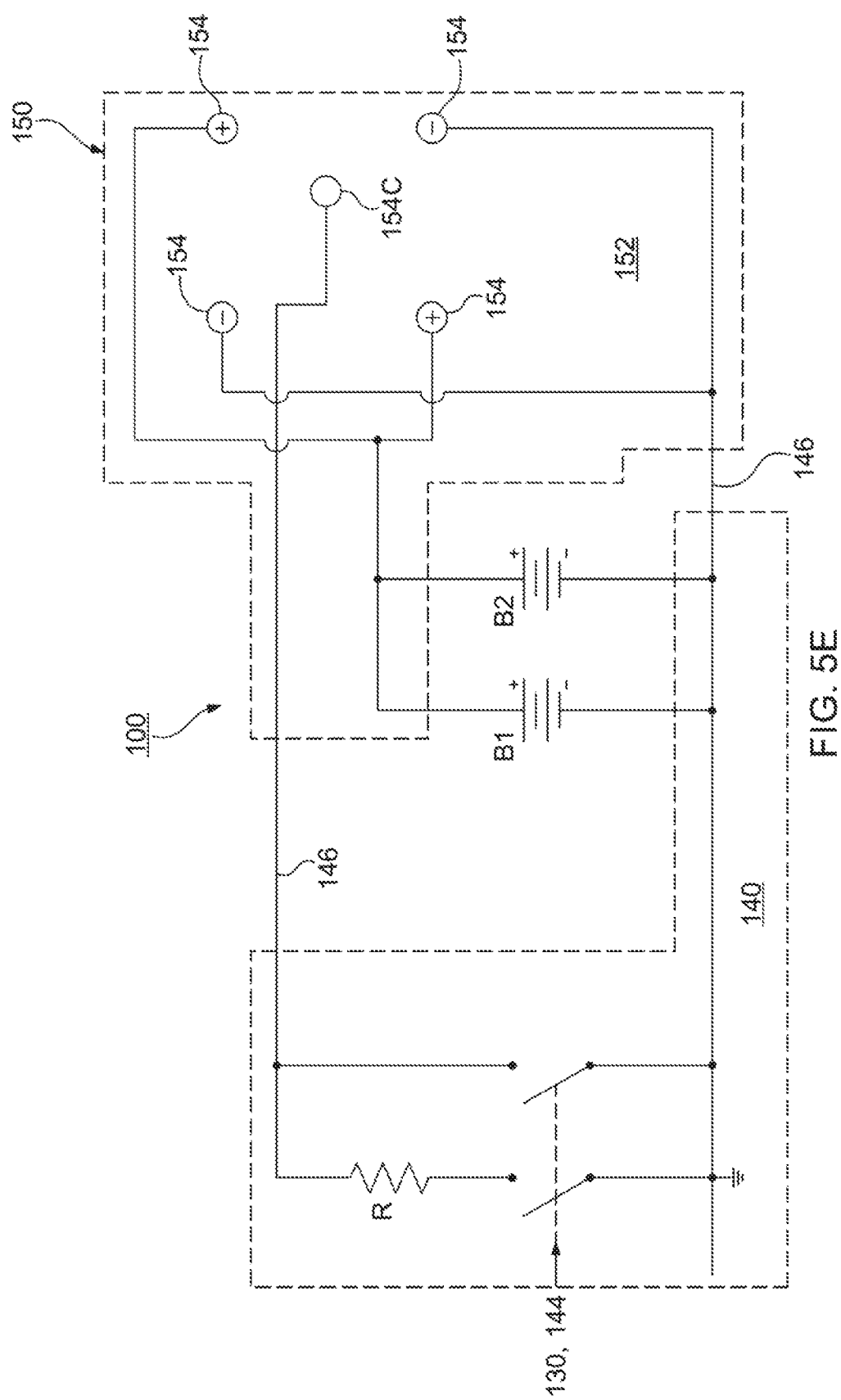
FIG. 5E is an electrical schematic diagram thereof.

FIGS. 5A and 5B are perspective views of an example embodiment of a battery assembly 100 for the example hand holdable light 10, FIG. 5C is an exploded view thereof, FIG. 5D is an enlarged view of the end 120 thereof including a switch 130, and FIG. 5E is an electrical schematic diagram thereof. Battery assembly 100 includes a housing 110 configured to receive one or more battery cells therein, e.g., in the spaces provided between the opposing ends 112, 114 110 thereof. The example battery housing 110 has a cross-section typically similar to that of the light body in which it is disposed. Thus, the example housing 110 has a cross-section defining a flattened cylindrical shape, an oval shape or an elliptical shape, as does housing 22.

One example of preferred battery cells includes, e.g., cylindrical cells each having a respective electrical battery terminal at each end thereof, similar in shape to a typical type AA or AAA battery cell. In the example battery assembly 100 illustrated, one battery cell is placed into a battery recess along one side of and adjacent to the central web 111 of housing 110 with the one terminal at one end of the battery cell making electrical connection to spring contact 112C and with the terminal at the other end of the battery cell making electrical connection to spring contact 114C, and the other battery cell is similarly placed into a battery recess along the opposite side of and adjacent to the central web 111 of housing 110.

Battery assembly 110 may be provided as illustrated wherein a user may install and/or remove battery cells therefrom or may be surrounded by a sheath or cover 102 (dashed) which covers and retains the battery cells therein. Where the battery cells are rechargeable lithium cells which require a specific control of voltage and current during charging, e.g., for safety and/or reliability, it is preferred that a sheath or cover be provided so that a user will not be able to substitute other than the manufacturer approved battery cells therein, at least not without having to disassemble battery assembly 100 in an easily detectable way.

At one end 112 of housing 110 of battery assembly 100 is a circuit board assembly 140 and an actuator 130, e.g., a pushbutton actuator 130, that is retained thereon by a cover 120 that is fastened 120S to end 112. End cover 120 has an opening therein in which actuator button 130 is moveable longitudinally for compressing a spring 132 that presses a plunger 134 against a snap-dome switch 144 of circuit board 142, thereby providing an electrical switch 130 that makes and breaks electrical connections between and among battery contact springs 112C (which connect to terminals of the battery cells B1, B2). A first electrical conductor 146 connects the contact springs 112C for the battery terminals between circuit board 142 and forward circuit board assembly 150 for providing electrical power to circuit board assembly 150. A second electrical conductor 146 provides an electrical connection between switch 139, 144 on circuit board 142 and forward circuit board assembly 150 for providing electrical signaling to circuit board assembly 150.

The forward end 114 of battery assembly 100 housing 110 receives a forward circuit board assembly 150 thereon. Circuit board assembly 150 includes a circuit board 152 that includes electrical contacts 114C on the side thereof that is adjacent to the contacts at the ends of the battery cells B1, B2 for connecting thereto and that includes a symmetrical pattern of contacts 154, 154C on the exposed side thereof. The exposed side of circuit board 152 may be covered by an insulating cover or sheet 156 that has a pattern of openings that correspond to the pattern of contacts 154, 154C whereby contacts 154, 154C are exposed when cover 156 or sheet 156 is in place. Sheet or cover 156 may be attached to end 114 of battery housing 110 for retaining circuit board assembly 150 adjacent thereto, preferably in a predetermined position, whereby contacts 154, 154C are in known predetermined positions relative to battery assembly 100. In the illustrated example, one pair of diametrically opposed outer contacts 154 connect to the positive terminal of the series connected battery cells, the other pair of diametrically opposed outer contacts 154 connect to the negative terminal of the series connected battery cells, and central contact 154C is employed for signaling actuation of switch 144.

In particular, it is preferred that electrical contacts 154 be in a predetermined pattern that is symmetrical relative to battery assembly 100, whereby battery assembly 100 may be placed into light housing 22 in either orientation and have contacts 154 present the same electrical configuration to battery contacts at the distal end of the cavity in housing 22 into which battery assembly 100 is placed. Thus, battery assembly 100 does not require a physical feature that prevents battery assembly 100 from being placed into housing 22 in other than the one orientation in which it is properly placed for powering light 10. This is an advantage of user convenience, especially where a user must replace battery assembly 100 under difficult circumstances, e.g., quickly and/or under reduced visibility.

A preferred symmetrical pattern 154 of contacts has four electrical contacts 154 evenly and symmetrically disposed 90° apart around a circle and a fifth electrical contact 154 at the center of that circle. Stated another way, a preferred symmetrical pattern has four electrical contacts 154 symmetrically disposed at the four corners of a square and a fifth electrical contact 154 at the center of that square.

The symmetrical pattern of electrical contacts 154 may include, e.g., connections to a battery positive terminal via a first pair of two diagonally opposing contacts 154 and connections to a battery negative terminal via the remaining pair of diagonally opposing contacts 154, plus a connection to a signaling conductor 146 for signaling the making and/or breaking of electrical connections resulting from actuation of snap dome 144 resulting from actuation and release of button 130. Switch 130 including, e.g., snap dome element 144, may have one or more make/break electrical contacts and so signaling via conductor 146 may include presenting two or more different voltage levels or presenting two or more different resistance values or another signaling regime, for controlling the operation and/or operating modes of light 10. Preferably, snap dome 144 has three longer legs and one shorter leg that makes electrical contact with circuit board 140 before the dome of snap dome 144 itself distorts to make electrical contact with circuit board 140, e.g., for providing two different operational results, such as momentary ON and continuously ON.

A complementary set of rearwardly facing electrical contacts 254, 254C of module assembly 200 are disposed in a pattern so that they electrically contact respective electrical contacts 154 of battery assembly 100 such that the same connections are made between battery assembly 100 and module assembly 200 irrespective of the orientation in which battery assembly 100 is placed into light housing 22, whereby light 10 can receive electrical power from battery assembly 100 to operate light 10 irrespective of the orientation of battery assembly 100 in light 10.

The pattern of contacts 254, 254C may be, e.g., a triangular pattern of three spring contacts 254, 254C matching the pattern of the center contact 154C and two adjacent ones of the outer contacts 154 of battery assembly 100 or may be a pattern of five spring contacts 245, 254C similarly matching the pattern of the contacts 154, 154C of battery assembly 100.

The example electrical circuit of battery assembly 100 includes two batteries B1, B2 that may be connected in series or in parallel as may be desired. In the parallel connection example illustrated, the negative terminals of batteries B1, B2 connect to contacts 112C of circuit board 140 and via a conductor 146 to circuit board 150 and a diametrically opposing pair of contacts 154 thereof for connecting battery negative to the circuitry of light 10. Similarly the positive terminals of batteries B1, B2 connect directly to circuit board 150 via contacts 114C to another diametrically opposing pair of contacts 154 thereof for connecting battery positive to the circuitry of light 10.

Circuit board 140 also provides electrical signaling responsive to partial and full actuation of switch 130. To that end, circuit board 140 has the switch snap dome element 144 in circuit with one or more resistors R mounted thereon for providing different resistances when snap dome 144 is not actuated (deformed), when it is partially actuated (deformed) so that the shorter leg thereof makes contact with circuit board 140 and when it is fully actuated (deformed) and the dome thereof makes contact with circuit board 140. As shown, the different resistances are, e.g., open circuit, resistance R, and short circuit, respectively, measured between central contact 154C and a battery negative contact 154. The signal in is provided to the circuitry of light 10 from circuit board 140 via another conductor 146 to central contact 154C of circuit board 150.

In one example embodiment of a battery assembly 100, battery assembly 100 includes two 3.7 volt, 2600 milliamp-hour, type 18650 rechargeable lithium-ion battery cells of a sort available from Streamlight, Inc. located in Eagleville, Pa.

One example of a suitable charging method for a lithium battery is described in U.S. Pat. No. 10,326,292 entitled "Battery Charger Operating Method and Method Usable with Plural Different Power Supplies," which is hereby incorporated herein by reference in its entirety and is assigned to Streamlight, Inc., the applicant and assignee herein. Other charging methods may also be employed.

Figure 6A:
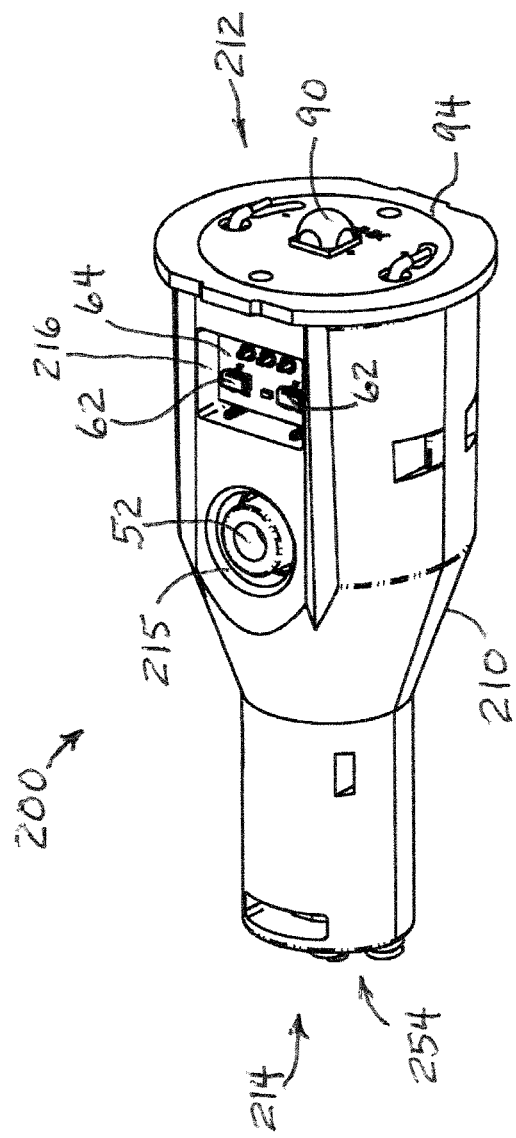
FIG. 6A is a perspective view of an example module assembly usable with the example hand holdable light.
Figure 6B:
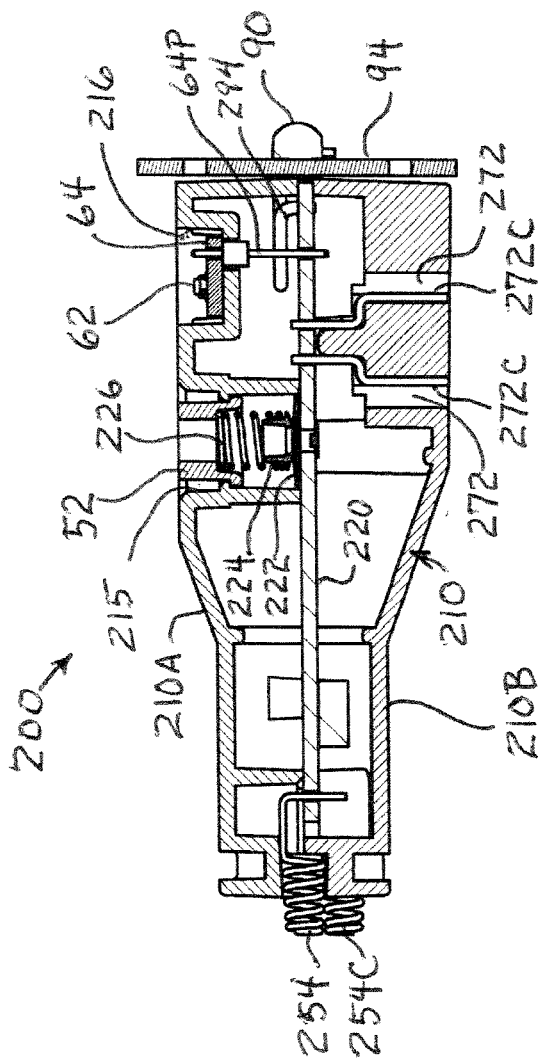
FIG. 6B is a side cross-sectional view thereof.

FIG. 6A is a perspective view of an example module assembly 200 usable with the example hand holdable light 10, FIG. 6B is a side cross-sectional view thereof, FIG. 6C is an exploded view thereof, and FIG. 6D is an exploded view of a modified example thereof, and FIG. 6E is a plan view of an example circuit board 220 of the modified example thereof. Module assembly 200 has a housing 210 including, e.g., an upper housing part 210A and a lower housing part 210B that are mated together to form housing 210 and to enclose various elements of module assembly 210 therein. The shape of housing 210, a larger diameter cylindrical part at the forward end and a smaller cylindrical part at the rearward end with a conical transition part therebetween, is similar to that of the central and forward portions 20C, 20F of light body 20 into which it is placed, e.g., from the forward end thereof.

The larger diameter forward part of housing 210 is substantially cylindrical as is the forward end interior of housing 22 of light 10 wherein it is disposed. The smaller diameter rearward part of housing 210 is substantially cylindrical and is disposed substantially within the interior of housing 22 generally in the region of the central portion 20C wherein it is at least partially disposed. Housing 210 parts 210A, 210B are fastened together by any suitable fastener, including complementary respective features thereof that engage when housing parts 210A and 210B are pushed together when they are in a desired relative alignment with each other. One example includes plural flexible barbed members of housing part 210B that engage respective ridges of upper housing part 210A, as illustrated, so as to snap together, although any suitable fastening may be employed.

At the forward end 212 of module assembly 200 are an LED light source 90 mounted on an LED circuit board 94 which typically includes a thermally conductive material for removing heat from LED 90. At the rearward end 214 thereof are a plurality of electrical contacts 254 extending rearwardly for making electrical connection to ones of electrical contacts 154 of battery assembly 100. While the illustrated example of light 10 has a reflector 80 and light source 90 configured for projecting light forwardly generally centered along a longitudinal axis of light 10, light 10 may be configured for projecting light in other directions and/or may include plural light sources.

Rearwardly extending contacts 254 of module assembly 200 are preferably in a configuration and positioned so as to make electrical contact with at least two of contacts 154 of battery assembly 100, e.g., for battery positive and negative connections, that are at two adjacent corners of the pattern of contacts 154 and with the contact 154C, e.g., for electrical signaling responsive to switch 130, 144, that is at the center of that pattern of contacts 154. Module assembly 200 may include, e.g., three spring contacts 254, 254C as in FIG. 6C or five spring contacts 254, 254C as in FIG. 6D, as may be desired for carrying the level of current expected to be drawn from battery assembly 100. Typically each contact 254 includes a spring contact 254 and preferably includes a helically wound conical spring contact 254. In one example light 10, the central contact 154C of battery assembly 100 and the contact spring 254C of module assembly 200 are approximately on and along the longitudinal axis of module 200 and of light body 20.

Upper housing part 210A has an opening 215 for receiving elements of switch 50, 52 therein which communicate the pressing and releasing of flexible actuator 50 of light 10 in a radially direction, Radially inward movement of flexible actuator 50 moves collar 52 inward to compress spring 226 to move plunger 224 inward to actuate snap dome switch 222 which is adjacent to circuit board 220 of module assembly 200, thereby to actuate the electrical switch 50-222 provided thereby.

Preferably, snap dome 222 has three longer legs and one shorter leg that makes electrical contact with a contact pattern 222P of circuit board 220 before the dome of snap dome 222 itself distorts to make electrical contact with another contact of pattern 222P of circuit board 220, e.g., for providing two different operational results, such as momentary ON and continuously ON. Releasing pressure on actuator 50 allows spring 226 to expand and the springy action of snap dome switch 222 to restore it to its undeformed shape thereby to de-actuate the electrical switch 50-222 and allow elements 224, 226, 52 to move radially outward.

Upper housing part 220A also has a recessed seat 216 for receiving a selector circuit board 64 therein. Circuit board 64, which connects to circuit board 220 via one or more connecting pins 64P, has one or more magnetically sensitive elements 62, e.g., one or more magnetic detectors 62, thereon which are responsive to the magnetic field proximate thereto, e.g., to the magnetic field of a permanent magnet 60M of actuator 60 disposed on the underside of selector actuator 60. When actuator 60, which is slidable transversely to light body 20 is slid to a position whereat the permanent magnet thereof is proximate to a magnetic detector 62, that magnetic detector 62 responds to the magnetic field and generates a signal that is employed to signal an operating condition of light 10, e.g., an operating mode thereof, represented by the transverse position of actuator 60, to a controller on circuit board 220.

In the example illustrated, mode selector 60 includes two magnetic detectors 62 so that at least two different operating modes may be selected, i.e. one when mode selector 60 is moved to be proximate a first detector 62 and another when mode selector 60 is moved to be proximate a second detector 62. A third operating mode may be and preferably is provided when mode selector 60 is moved to a position intermediate the two magnetic detectors 62, at which neither of the two magnetic detectors 62 respond to the magnet of selector 60. In the example light, mode selector 60 preferably selects three operating modes including, e.g., a high intensity light beam, a medium intensity light beam and a low intensity light beam, which may also be referred to as high, medium and low brightness. Preferably a detent is provided, e.g., by a small spherical ball that is biased towards a surface that has respective recesses at preferred locations whereat mode selector 60 is desired to be retained by the detent.

Suitable magnetic detectors 62 include, e.g., a Hall-Effect magnetic field detector 62 and/or a magnetic reed switch 62. A Hall-Effect device is an electronic device that responds to magnetic field strength and may include, e.g., an amplifier and detector to respond to or detect a particular magnetic field strength. A reed switch is an electro-mechanical switch wherein the arm of the switch is flexible or bendable and includes a magnetic material and so is movable by a magnetic field, e.g., to open a NC reed switch or close a NO reed switch.

Circuit board 220 includes electronic circuits and components that control the operation and operating modes of light 10, including turning light source 90 ON and OFF, momentarily and/or continuously, dimming and un-dimming light source 90, operating light source 90 in flashing, blinking and/or strobing modes, charging and discharging of battery assembly 100, and the like. Circuit board 220 includes, e.g., electrical conductors 294, e.g., wires 294, that connect to LED 90 via LED circuit board 94 and electronic circuits and components for applying and controlling the charging current received via charging contacts 72 and conductors 272 to battery assembly 100 via contacts 254, 154.

In one example embodiment of a hand holdable light 10, charging guide 70 and contacts 72 thereof are substantially the same as those of earlier lights, whereby hand holdable light 10 may be physically placed into and receive battery charging current from the same charging devices as the earlier lights, e.g., "heritage" charging devices. Such earlier lights may include. e.g., the STINGER® light and the STRION® light which are available from Streamlight, Inc. of Eagleville, Pa.

In some instances, such earlier lights employed batteries of different types, e.g., a nickel-cadmium (NiCd) or a nickel-metal-hydride (NiMH) battery type, than does hand holdable light 10, and so the charging parameters of the lithium batteries of battery assembly 100 can be substantially different from, and possibly incompatible with, the charging parameters of the earlier battery types, e.g., NiCd and/or NiMH batteries.

In such instance, circuit board 220 may include an electronic circuit for controlling the charging of battery assembly 100 in a manner that charging current can be received from such "heritage" charging devices. An example of a suitable electronic circuit is described in U.S. Pat. No. 8,356,910 entitled "Adapter Circuitry for Enabling Charging And/or Recharging a Device or Battery of a Different Type,"

which is hereby incorporated herein by reference in its entirety and is assigned to Streamlight, Inc., the assignee herein.

In one example embodiment circuit board 220 has one or more light producing indicator lights ID1, ID2 thereon, e.g., LEDs producing light of different colors, for providing one or more indications of battery condition, e.g., the charging and/or state of charge of the battery of assembly 100. In such case, actuator boot 250 is preferably transparent or translucent so that such LED indicators ID1, ID2 are visible to a user through boot 250 when illuminated.

For example, a green LED indicator ID1, ID2 thereon may be illuminated for a predetermined period of time, e.g., about 5 seconds, after light 10 is turned ON when the battery has a substantial level of charge at that time.

Alternatively or additionally, a red LED indicator ID1, ID2 thereon may be illuminated continuously when the battery charge reaches a relatively low level and may be intermittently illuminated, e.g., flashing or blinking, when the battery charge decreases to an even lower level where the light turning OFF within a relatively short period of time, e.g., about 15 minutes, has been reached.

Also alternatively or additionally, a red LED indicator ID1, ID2 on circuit board 220 may be illuminated continuously when the battery is being charged and a green indicator thereon may be illuminated continuously when the battery reaches substantially full charge.

Lower module housing 210B preferably has a pair of holes 272 that, when module assembly 200 is in place in housing 22, align with holes in housing 22 through which fasteners 72 are disposed. Respective conductors 272C extend into holes 272 and connect with circuit board 220. Holes 272 align with and receive fasteners 72 that provide charging contacts 72 of light 10, whereby charging current received thereby can flow to circuit board 200 and thence to battery assembly 100 for charging the batteries thereof.

Preferably the ends contact springs 254, 254 are connected to and supported by circuit board 220 and extend rearwardly through the rearward end 214 of module assembly 200 and housing 210 thereof, whereby the conical spring portions thereof extend rearwardly from the rearward end 214 of housing 210. Preferably, housing parts 210A and 210B have respective longitudinal recesses and/or projections that provide seats for the ends of contact springs 254, 254C for aligning and supporting those springs in desired positions, for making contact to respective ones of contacts 154 of battery assembly 100.

Figure 7A:
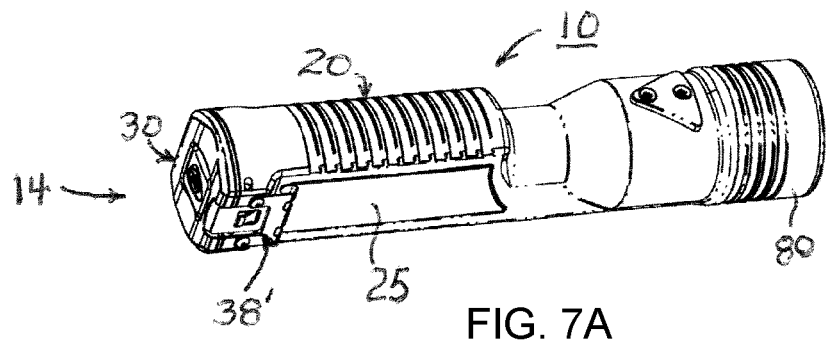
Figure 7C:
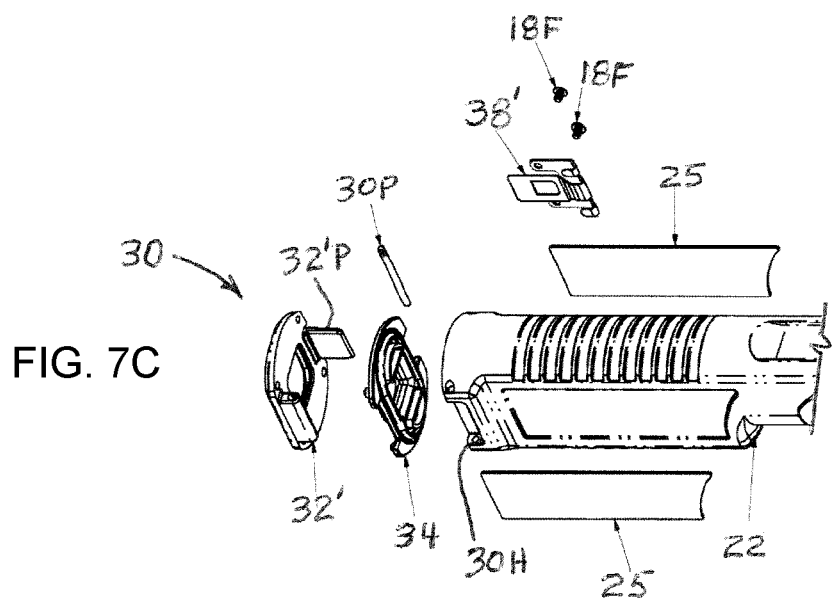
FIG. 7C is an exploded view of a part thereof, illustrating an example cover and a clasp thereof.
Figure 7B:
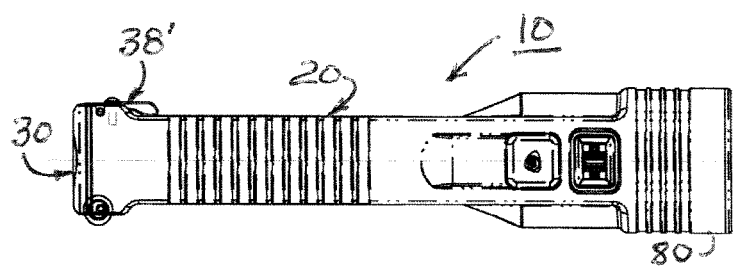

FIG. 7A and FIG. 7B are perspective and side views, respectively, of an example hand holdable light 10 and FIG. 7C is an exploded view of a part thereof, illustrating an example cover 30 and alternative clasp 38' or latch 38' thereof, for covering the opening at the rearward end 14 of light body 20 to retain the battery assembly 100 therein. Latch or clasp 38' allows tail cap or cover 30 to be opened and retained in a closed position for replacing and retaining a source of electrical power in light body 20.

Battery cover 30 includes a cover body 32' that is hinged 30H, 30P to housing 22 and that has a substantially perpendicular extending projection 32'P that extends forwardly for engaging clasp/latch 38' when cover 30 is closed to be adjacent to housing 22. Cover body 32' differs from previously described cover body 32 primarily by having the latch projection 32'P. Latch/clasp 38' is, e.g., a springy flexible U-shaped clasp, attached to housing 22 by one or more fasteners 18F with its open end facing rearward 14 for receiving projection 32'P when cover 30, 32' is pivoted closed. Latch 38' is released to allow cover 30 to be opened by spreading apart the legs of U-shaped clasp 38' thereby releasing projection 32'P from being retained therein, whereby cover 30 may be pivoted away from light body 20.

In a typical embodiment, housing 22, tail cap 32, latch 38, 38', clip 18, reflector 80, face ring 82 and similar parts may be of a metal, e.g., aluminum, brass, magnesium, steel, spring steel, beryllium copper, and the like, or of a plastic, e.g., a nylon, reinforced nylon, engineered nylon, Nylon 6, ABS, polycarbonate, polyethylene, a PC/PET plastic blend, ABS plastic, polypropylene, polystyrene, polyester-polycarbonate blends and ABS polycarbonate blends (such as LEXAN® polycarbonate, XENOY polyester-polycarbonate blend and CYCALOY ABS polycarbonate blend), or may be a thermoplastic nylon or other elastomeric plastic such as that sold under the trademarks CAPRON® and NYPEL® or a thermoplastic elastomer compound or thermoplastic vulcanizate sold under the trademark NYLABOND®, or any other suitable plastic material, with or without a reinforcing material such as a fiberglass, carbon fiber or the like, and with or without a thermally conductive filler material and the like.

Battery housing 110, module housing 210 and similar parts may be of a plastic, e.g., a nylon, reinforced nylon, engineered nylon, Nylon 6, ABS, polycarbonate, polyethylene, a PC/PET plastic blend, ABS plastic, polypropylene, polystyrene, polyester-polycarbonate blends and ABS polycarbonate blends (such as LEXAN® polycarbonate, XENOY polyester-polycarbonate blend and CYCALOY ABS polycarbonate blend), or may be a thermoplastic nylon or other elastomeric plastic such as that sold under the trademarks CAPRON® and NYPEL® or a thermoplastic elastomer compound or thermoplastic vulcanizate sold under the trademark NYLABOND®, or any other suitable plastic material, with or without a reinforcing material such as a fiberglass, carbon fiber or the like, and with or without a thermally conductive filler material and the like. Resilient and/or flexible parts such as tail cap seal 34, switch actuator boot 250, lens seal 84S, grip 25, and similar parts may be of a rubber or elastomer material, e.g., rubber, neoprene rubber, latex rubber, silicone rubber, SANTOPRENE® elastomer, polyurethane, and like resilient and/or flexible material.

A hand holdable light 10 may comprise: a light body 20 having a forward end and a rearward end, and having a cavity for receiving a source of electrical power, the light body having a forward portion proximate the forward end thereof, a rearward portion proximate the rearward end thereof, and a central portion between and adjacent to the forward portion and to the rearward portion thereof; a light source 90 proximate the forward end of the light body; a switch actuator 50 on the light body for selectively energizing the light source from the source of electrical power; wherein the rearward portion of the light body has a non-circular cross-section having a larger transverse dimension and a smaller transverse dimension; wherein the switch actuator is disposed substantially on the forward portion of the light body and substantially along a longitudinal line may include one end of the larger transverse dimension; wherein the central portion of the light body has a transverse dimension that is less than the larger transverse dimension of the rearward portion, thereby defining a recess in the central portion on a side of the light body that is opposite to the switch actuator; whereby the light is holdable by a hand having a palm proximate the rearward portion, a finger or a thumb proximate the recess of the central portion and the other of a finger or a thumb proximate the switch actuator. The light body 20 may have a longitudinal recess in which the switch actuator is disposed. The light body 20: may include a second actuator on the rearward end of the light body; or may have a transverse recess in the rearward end of the light body; or may have a transverse recess in the rearward end of the light body in the direction of the larger transverse dimension thereof; or may include a second actuator disposed in a transverse recess on the rearward end of the light body; or may include a second actuator disposed in a transverse recess on the rearward end of the light body in the direction of the larger transverse dimension thereof. The rearward portion of the light body 20 may have a cross-section defining a flattened cylindrical shape, an oval shape or an elliptical shape; or the central portion of the light body may have a cross-section defining a flattened cylindrical shape, an oval shape or an elliptical shape having a larger transverse dimension that is in the same direction as the larger transverse dimension of the rearward portion and is smaller than the larger transverse dimension of the rearward portion; or the rearward portion of the light body may have a cross-section defining a flattened cylindrical shape, an oval shape or an elliptical shape and the central portion of the light body may have a cross-section defining a flattened cylindrical shape, an oval shape or an elliptical shape having a larger transverse dimension that is in the same direction as the larger transverse dimension of the rearward portion and is smaller than the larger transverse dimension of the rearward portion. The hand holdable light 10 may further comprise: a mode selecting actuator disposed on the light body adjacent to the switch actuator for selecting operating modes for the light source; or a mode selecting actuator disposed on the forward portion of the light body adjacent to the switch actuator for selecting operating modes for the light source; or a mode selecting actuator disposed on the forward portion of the light body adjacent to and in line forward of the switch actuator for selecting operating modes for the light source. The mode selecting actuator 60 may be movable in a direction along an exterior surface of the light body for actuating a mode selecting electrical switch in the light body, wherein: the mode selecting electrical switch is responsive to the position of the mode selecting actuator for selecting operating modes for the light source; or the mode selecting electrical switch is responsive to the position of a magnet of the mode selecting actuator for selecting operating modes for the light source; or the mode selecting electrical switch is a Hall-effect device or is a magnetic reed switch that is responsive to the magnetic field of a magnet of the mode selecting actuator for selecting operating modes for the light source. The light body 20 may have a cover for covering an opening into the cavity of the light body for receiving a source of electrical power therein, wherein the source of electrical power may include an electrical switch on an end thereof that is proximate the cover when the source of electrical power is in the cavity of the light body, wherein: the cover has an opening through which the electrical switch is actuatable from external to the light body; or the end cover has a flexible seal covering an opening through which the electrical switch is actuatable from external to the light body; or the end cover has a flexible seal covering an opening through which the electrical switch is actuatable from external to the light body and providing a seal between the cover and the body housing at the opening into the cavity of the body housing. The rearward portion of the light body 20 may have a non-circular cross-section that may define opposing broad surfaces, the light may further have: a pattern in one or both of the opposing broad surfaces; or a coating on one or both of the opposing broad surfaces; or a sheet material on one or both of the opposing broad surfaces; or one of a pattern, a coating or a sheet material on one of the opposing broad surfaces and another of a pattern, a coating or a sheet material on another of the opposing broad surfaces; whereby the pattern, coating or sheet material has higher coefficient of friction than does the broad opposing surface when smooth and/or uncovered. The light body 20 may have a cover for covering an opening into the cavity of the light body for receiving a source of electrical power therein, wherein the light body and the cover have respective complementary features providing a latch for retaining the cover in a closed position adjacent the opening of the light body. The cover 30 may be hinged at one end thereof and may have a latch feature at the other end thereof, the latch may include: a loop or a clasp on the light body for engaging the latch feature of the cover for the retaining the cover in a closed position adjacent the opening of the light body. The light body 20 may have a cover 30 for covering an opening into the cavity of the light body 20 for receiving a source of electrical power therein, wherein the cover may include a second switch actuator 40 for selectively energizing the light source from the source of electrical power. The source of electrical power 100 may include an electrical switch for selectively energizing the light source, and the cover 30 may include a switch actuator for actuating the electrical switch. The source of electrical power 100 may include a battery assembly having a symmetrical pattern of externally accessible electrical contacts on an end thereof that is proximate the forward end of the light body, and the light body 20 may include at least two electrical contacts positioned for making respective electrical connections to predetermined ones of the symmetrical pattern of electrical contacts of the battery assembly when the battery assembly is in the cavity of the light body, whereby proper electrical connections are made to the battery assembly irrespective of its orientation in the cavity of the light body. The hand holdable light 10 may further include: a clip on the light body; or a latch on the light body for retaining a cover of an opening of the light body in a closed position adjacent the opening of the light body; or a clip on the light body and a latch on the light body for retaining a cover of an opening of the light body in a closed position adjacent the opening of the light body. The latch on the light body 20 may include a clasp, and a single metal piece may be formed and attached to the light body to provide the clip and the clasp.

A hand holdable light 10 may comprise: a light body having a forward end and a rearward end, and having a cavity for receiving a source of electrical power, the light body having a forward portion proximate the forward end thereof, a rearward portion proximate the rearward end thereof, and a central portion between and adjacent to the forward portion and to the rearward portion thereof; a light source proximate the forward end of the light body; a first switch actuator on the light body for selectively energizing the light source from the source of electrical power; a cover at the rearward end of the light body for covering an opening into the cavity thereof, whereby the source of electrical power can be placed into the cavity and can be removed from the cavity when the cover uncovers the opening into the cavity; the cover may include a second switch actuator for selectively energizing the light source from the source of electrical power; wherein the rearward portion of the light body has a non-circular cross-section having a larger transverse dimension and a smaller transverse dimension; wherein the first switch actuator is disposed substantially on the forward portion of the light body and substantially along a longitudinal line may include one end of the larger transverse dimension; wherein the central portion of the light body has a transverse dimension that is less than the larger transverse dimension of the rearward portion, thereby defining a recess in the central portion on a side of the light body that is opposite to the first switch actuator; whereby the light is holdable by a hand having a palm proximate the rearward portion, a finger or a thumb proximate the recess of the central portion and the other of a finger or a thumb proximate the first switch actuator. The hand holdable light 10 wherein: the first switch actuator is disposed in a longitudinal recess of the light body; and the second switch actuator is disposed in a recess in the cover. The hand holdable light 10 wherein: the rearward portion of the light body has a cross-section defining a flattened cylindrical shape, an oval shape or an elliptical shape; or the central portion of the light body has a cross-section defining a flattened cylindrical shape, an oval shape or an elliptical shape having a larger transverse dimension that is in the same direction as the larger transverse dimension of the rearward portion and is smaller than the larger transverse dimension of the rearward portion; or the rearward portion of the light body has a cross-section defining a flattened cylindrical shape, an oval shape or an elliptical shape and the central portion of the light body has a cross-section defining a flattened cylindrical shape, an oval shape or an elliptical shape having a larger transverse dimension that is in the same direction as the larger transverse dimension of the rearward portion and is smaller than the larger transverse dimension of the rearward portion. The hand holdable light 10 may further comprise: a mode selecting actuator disposed on the light body adjacent to the first switch actuator for selecting operating modes for the light source; or a mode selecting actuator disposed on the forward portion of the light body adjacent to the switch actuator for selecting operating modes for the light source; or a mode selecting actuator disposed on the forward portion of the light body adjacent to and in line forward of the switch actuator for selecting operating modes for the light source. The hand holdable light 10 wherein the rearward portion of the light body having a non-circular cross-section defines opposing broad surfaces, the light further having: a pattern in one or both of the opposing broad surfaces; or a coating on one or both of the opposing broad surfaces; or a sheet material on one or both of the opposing broad surfaces; or wherein the pattern, coating or sheet material has higher coefficient of friction than does the broad opposing surface when smooth and/or uncovered. The hand holdable light 10 wherein the source of electrical power may include an electrical switch for selectively energizing the light source, and wherein the switch actuator of the cover is positioned for actuating the electrical switch of the source of electrical power. The hand holdable light 10: wherein the source of electrical power may include a battery assembly having a symmetrical pattern of externally accessible electrical contacts on an end thereof that is proximate the forward end of the light body, and wherein the light body may include at least two electrical contacts positioned for making respective electrical connections to predetermined ones of the symmetrical pattern of electrical contacts of the battery assembly when the battery assembly is in the cavity of the light body, whereby proper electrical connections are made to the battery assembly irrespective of its orientation in the cavity of the light body.

A battery assembly 100 may comprise: a battery housing 110 having first and second ends and having a receptacle for receiving a battery therein, the receptacle having at least two electrical contacts to which respective terminals of the battery connect when the battery is received in the receptacle; an electrical switch 130 on the first end of the battery housing, the electrical switch having an externally accessible actuator for making and breaking an electrical connection between a first and a second electrical switch contact; a pattern 150 of externally accessible electrical contacts on the second end of the battery housing, wherein one of the externally accessible electrical contacts is connected to a first of the two electrical contacts of the receptacle; a first electrical conductor connected to a second of the two electrical contacts of the receptacle and to a second one of the externally accessible electrical contacts; a second electrical conductor connected to a third one of the externally accessible electrical contacts; and wherein the first electrical switch contact of the electrical switch is coupled to the second of the two electrical contacts of the receptacle and the second electrical switch contact of the electrical switch is coupled to the second electrical conductor. The pattern 150 of externally accessible electrical contacts may define a symmetrical pattern wherein: the third one of the externally accessible electrical contacts is located centrally within the pattern; the first one of the externally accessible electrical contacts is located symmetrically on the pattern with a fourth one of the externally accessible electrical contacts; and the second one of the externally accessible electrical contacts is located symmetrically on the pattern with a fifth one of the externally accessible electrical contacts, whereby connection to the battery assembly may be made by three use device contacts with the battery assembly being in at least two different orientations relative to the three use device contacts. The first, second, fourth and fifth ones of the externally accessible electrical contacts may be disposed at corners of a square pattern with the third one of the externally accessible electrical contacts at the intersection of diagonals thereof; or the first, second, fourth and fifth ones of the externally accessible electrical contacts are disposed around a circular pattern with the third one of the externally accessible electrical contacts at the center of the circle. The battery housing 110 may have longitudinal direction and a transverse cross-section defining a flattened cylindrical shape, an oval shape or an elliptical shape, and wherein the receptacle is along the longitudinal direction. The first and second ends of the battery housing 110 may be connected by a central web therebetween, and wherein a space adjacent to the central web and between the first and second ends may define the receptacle into which a battery may be placed; or the first and second ends of the battery housing may be connected at respective central regions thereof by a central web, wherein two spaces adjacent opposite sides of the central web between the first and second ends define two receptacles into which batteries may be placed. The battery assembly 100 may further comprise a first cover on the first end of the battery housing having an opening therethrough, wherein the electrical switch is disposed between the first cover and the first end of the battery housing, and wherein the actuator of the electrical switch is disposed in the opening of the first cover. The battery assembly 100 wherein actuation of the electrical switch provides signaling may include presenting two or more different voltage levels or presenting two or more different resistance values. The battery assembly 100 may further comprise: an electrical circuit board adjacent the second end of the battery housing, the electrical circuit board having a pattern of electrically conductive features thereon that correspond to the pattern of externally accessible electrical contacts on the second end of the battery housing; and a second cover on the second end of the battery housing having a pattern of openings therethrough that correspond to the pattern of externally accessible electrical contacts on the second end of the battery housing, wherein the pattern of electrically conductive features of the electrical circuit board aligns with the pattern of openings of the second cover to provide the externally accessible electrical contacts on the second end of the battery housing. The battery assembly wherein the first and fourth ones of the externally accessible electrical contacts are coupled to a first one of the at least two electrical contacts to which respective terminals of the battery connect, wherein the second and fifth ones of the externally accessible electrical contacts are coupled to a second one of the at least two electrical contacts to which respective terminals of the battery connect. The battery assembly 100 wherein the third one of the externally accessible electrical contacts is coupled to one of the at least two electrical contacts to which respective terminals of the battery connect by the electrical switch and by the electrical switch and a resistance. The battery assembly 100 wherein the electrical switch has an open position, a first closed position and a second closed position, wherein the second electrical switch contact of the electrical switch is connected to the second electrical conductor in the first closed position and is connected to the second electrical conductor via a resistance in the second closed position. The battery assembly 100 in combination with a light body 20 may comprise: a body housing having a cavity therein for receiving the battery assembly; and a cover covering an opening into the cavity of the body housing wherein the cover is openable for placing and removing the battery assembly in the cavity of the body housing, wherein: the cover has an opening through which the electrical switch is actuatable from external to the light body; or the cover has a flexible seal covering an opening through which the electrical switch is actuatable from external to the light body; or the cover has a flexible seal covering an opening through which the electrical switch is actuatable from external to the light body and providing a seal between the cover and the body housing at the opening into the cavity of the body housing.

A battery assembly may comprise: a battery housing having first and second ends and having a receptacle for receiving a battery therein, the receptacle having at least two electrical contacts to which respective terminals of the battery connect when the battery is received in the receptacle; an electrical switch on the first end of the battery housing, the electrical switch having an externally accessible actuator for making and breaking an electrical connection between a first electrical switch contact and a second electrical switch contact; a symmetrical pattern of externally accessible electrical contacts on the second end of the battery housing, wherein the symmetrical pattern may include: first and second externally accessible electrical contacts; the third one of the externally accessible electrical contacts is located centrally within the pattern; the first one of the externally accessible electrical contacts is located symmetrically on the pattern with a fourth one of the externally accessible electrical contacts; and the second one of the externally accessible electrical contacts is located symmetrically on the pattern with a fifth one of the externally accessible electrical contacts, wherein the first of the externally accessible electrical contacts is connected to a first of the two electrical contacts of the receptacle; a first electrical conductor connected to a second of the two electrical contacts of the receptacle and to the second externally accessible electrical contact; a second electrical conductor connected to the third externally accessible electrical contact; and wherein the first electrical switch contact of the electrical switch is coupled to the second of the two electrical contacts of the receptacle and the second electrical switch contact of the electrical switch is coupled to the second electrical conductor, whereby connection to the battery assembly may be made by three contacts of a use device contacts with the battery assembly being in at least two different orientations relative to the three contacts of the use device. The battery assembly 100 wherein: the first, second, fourth and fifth ones of the externally accessible electrical contacts are disposed at corners of a square pattern with the third one of the externally accessible electrical contacts at the intersection of diagonals thereof; or the first, second, fourth and fifth ones of the externally accessible electrical contacts are disposed around a circular pattern with the third one of the externally accessible electrical contacts at the center of the circle. The battery assembly 100 wherein the battery housing has longitudinal direction and a transverse cross-section defining a flattened cylindrical shape, an oval shape or an elliptical shape, and wherein the receptacle is along the longitudinal direction. The battery assembly 100 wherein: the first and second ends of the battery housing are connected by a central web therebetween, and wherein a space adjacent to the central web and between the first and second ends defines the receptacle into which a battery may be placed; or the first and second ends of the battery housing are connected at respective central regions thereof by a central web, wherein two spaces adjacent opposite sides of the central web between the first and second ends define two receptacles into which batteries may be placed. The battery assembly 100 may further comprise a first cover on the first end of the battery housing having an opening therethrough, wherein the electrical switch is disposed between the first cover and the first end of the battery housing, and wherein the actuator of the electrical switch is disposed in the opening of the first cover. The battery assembly 100 wherein actuation of the electrical switch provides signaling may include presenting two or more different voltage levels or presenting two or more different resistance values. The battery assembly 100 may further comprise: an electrical circuit board adjacent the second end of the battery housing, the electrical circuit board having a pattern of electrically conductive features thereon that correspond to the pattern of externally accessible electrical contacts on the second end of the battery housing; and a second cover on the second end of the battery housing having a pattern of openings therethrough that correspond to the pattern of externally accessible electrical contacts on the second end of the battery housing, wherein the pattern of electrically conductive features of the electrical circuit board aligns with the pattern of openings of the second cover to provide the externally accessible electrical contacts on the second end of the battery housing. The battery assembly 100 wherein the first and fourth ones of the externally accessible electrical contacts are coupled to a first one of the at least two electrical contacts to which respective terminals of the battery connect, wherein the second and fifth ones of the externally accessible electrical contacts are coupled to a second one of the at least two electrical contacts to which respective terminals of the battery connect. The battery assembly 100 wherein the third one of the externally accessible electrical contacts is coupled to one of the at least two electrical contacts to which respective terminals of the battery connect by the electrical switch and by the electrical switch and a resistance. The battery assembly 100 wherein the electrical switch has an open position, a first closed position and a second closed position, wherein the second electrical switch contact of the electrical switch is connected to the second electrical conductor in the first closed position and is connected to the second electrical conductor via a resistance in the second closed position. The battery assembly 100 in combination with a light body may comprise: a body housing having a cavity therein for receiving the battery assembly; and a cover covering an opening into the cavity of the body housing wherein the cover is openable for placing and removing the battery assembly in the cavity of the body housing, wherein: the cover has an opening through which the electrical switch is actuatable from external to the light body; or the cover has a flexible seal covering an opening through which the electrical switch is actuatable from external to the light body; or the cover has a flexible seal covering an opening through which the electrical switch is actuatable from external to the light body and providing a seal between the cover and the body housing at the opening into the cavity of the body housing.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

Although terms such as "front," "back," "rear," "side," "end," "top," "bottom," "up," "down," "left," "right," "upward," "downward," "forward," "backward," "under" and/or "over," "vertical," "horizontal," and the like may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

As used herein, the term "and/or" encompasses both the conjunctive and the disjunctive cases, so that a phrase in the form "A and/or B" encompasses "A" or "B" or "A and B." In addition, the term "at least one of" one or more elements is intended to include one of any one of the elements, more than one of any of the elements, and two or more of the elements up to and including all of the elements, and so, e.g., the phrase in the form "at least one of A, B and C" includes "A," "B," "C," "A and B," "A and C," "B and C," and "A and B and C."

A fastener as used herein may include any fastener or other fastening device that may be suitable for the described use, including threaded fasteners, e.g., bolts, screws and driven fasteners, as well as pins, rivets, nails, spikes, barbed fasteners, clips, clamps, nuts, speed nuts, cap nuts, acorn nuts, and the like. Where it is apparent that a fastener would be removable in the usual use of the example embodiment described herein, then removable fasteners would be preferred in such instances. A fastener may also include, where appropriate, other forms of fastening such as a formed head, e.g., a peened or heat formed head, a weld, e.g., a heat weld or ultrasonic weld, a braze, and adhesive, and the like.

As used herein, the terms "connected" and "coupled" as well as variations thereof may or may not be intended to be exact synonyms, but may also encompass some similar things and some different things. The term "connected" as indicated by its context may be used generally to refer to elements that have a direct electrical and/or physical contact to each other, whereas the term "coupled" as indicated by its context may be used generally to refer to elements that have an indirect electrical and/or physical contact with each other, e.g., via one or more intermediate elements, so as to cooperate and/or interact with each other, and may include elements in direct contact as well.

The term battery is used herein to refer to an electrochemical device comprising one or more electro-chemical cells and/or fuel cells, and so a battery may include a single cell or plural cells, whether as individual units or as a packaged unit. A battery is one example of a type of an electrical power source suitable for a portable, hand holdable or other device. Such devices could include power sources including, but not limited to, fuel cells, super capacitors, solar cells, and the like. Any of the foregoing may be intended for a single use or for being rechargeable or for both, and/or plural ones thereof may be combined into a battery pack or battery assembly.

Various embodiments of a battery may have one or more battery cells, e.g., one, two, three, four, or more battery cells, as may be deemed suitable for any particular device. A battery may employ various types and kinds of battery chemistry types, e.g., a carbon-zinc, alkaline, lead acid, nickel-cadmium (Ni—Cd), nickel-metal-hydride (NiMH) or lithium-ion (Li-Ion) battery type, of a suitable number of cells and cell capacity for providing a desired operating time and/or lifetime for a particular device, and may be intended for a single use or for being rechargeable or for both. Examples may include a three or six cell lead acid battery typically producing about 6 volts or about 12 volts, a three cell Ni—Cd battery typically producing about 3.6 volts, a four cell NiMH battery typically producing about 4.8 volts, a five cell NiMH battery producing about 6 volts, a Li-Ion battery typically producing about 3.5 volts, or a two-cell Li-Ion battery typically producing about 7 volts, it being noted that the voltages produced thereby will be higher when approaching full charge and will be lower in discharge, particularly when providing higher current and when reaching a low level of charge, e.g., becoming discharged.

The term DC converter is used herein to refer to any electronic circuit that receives at an input electrical power at one voltage and current level and provides at an output DC electrical power at a different voltage and/or current level. Examples may include a DC-DC converter, an AC-DC converter, a boost converter, a buck converter, a buck-boost converter, a single-ended primary-inductor converter (SEPIC), a series regulating element, a current level regulator, and the like. The input and output thereof may be DC coupled and/or AC coupled, e.g., as by a transformer and/or capacitor. A DC converter may or may not include circuitry for regulating a voltage and/or a current level, e.g., at an output thereof, and may have one or more outputs providing electrical power at different voltage and/or current levels and/or in different forms, e.g., AC or DC.

Further, what is stated as being "optimum" or "deemed optimum" may or may not be a true optimum condition, but is the condition deemed to be desirable or acceptably "optimum" by virtue of its being selected in accordance with the decision rules and/or criteria defined by the designer and/or applicable controlling function.

While the present invention has been described in terms of the foregoing example embodiments, variations within the scope and spirit of the present invention as defined by the claims following will be apparent to those skilled in the art. For example, a handle or gripping arrangement of example light 10, e.g., as provided by housing portions 210F, 210C, 210R, may be provided on lights of substantially larger or smaller relative sizes, and irrespective of whether light is projected forwardly or to a side, in a spot beam or in a flood beam, in a single beam or plural beams, or in another direction and/or manner.

Further, the body of light 10 or similar structure may be utilized as a handle of a light or of another hand holdable or portable device for providing, e.g., an improved grip or carrying member for any such device.

While example light 10 is illustrated as having two actuators 50, 60 along the forward portion of light body 20 and an actuator an tail cap 30, having such actuators is not necessary to enjoy the benefits of the described arrangement. For example, a light 10 may not have a rear actuator 40 and/or may have a single actuator along the side of the housing in forward portion 20F thereof.

Where housing 22 is a molded plastic material, a clip 18 and/or latch 38, 38' could be integrally molded therewith, as could gripping surfaces 25; and where housing 22 is metal, clip 18 and/or latch 38, 38' is preferably a springy metal, e.g., spring steel or beryllium copper, and the like attached by one or more fasteners 18F. Fasteners 18F may be utilized to attach clip 18 and/or to attach latch 38, 38'.

Further, clip 18 and latch 38, 38' may be provided as integral formed part providing both functions, e.g., as a formed springy metal combined clip and latch.

A light 10 may or may not employ a rechargeable battery, and so may or may not include a charging interface of which guide 70 is one example, albeit an advantageous one.

While example light 10 is illustrated as having certain surface features, e.g., partially circumferential ridges on rear grip portion 210R, other features such as knurling, a resilient covering, different ridges, and the like may be provided to resist the light slipping while in a user's hand. A rubber-like material may be provided as grip 25 on both sides of the rearward part 20R of light body 20.

While certain features may be described as a raised feature, e.g., a ridge, boss, flange, projection, detent, or other raised feature, such feature may be positively formed or may be what remains after a recessed feature, e.g., a groove, slot, hole, indentation, recess, detent, or other recessed feature, is made. Similarly, while certain features may be described as a recessed feature, e.g., a groove, slot, hole, indentation, recess or other recessed feature, such feature may be positively formed or may be what remains after a raised feature, e.g., a ridge, boss, flange, projection or other raised feature, is made. In addition, where a raised feature engages a recessed feature, such as a cylindrical projection that engages a complementary receptacle, the relative positions of the raised and recessed features may be interchanged or other wise modified.

Each of the U.S. Provisional applications, U.S. Patent applications, and/or U.S. Patents, identified herein is hereby incorporated herein by reference in its entirety, for any purpose and for all purposes irrespective of how it may be referred to or described herein.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A battery assembly comprising:
   a battery housing having first and second ends and having a receptacle for receiving a battery therein, the receptacle having at least two electrical contacts to which respective terminals of the battery connect when the battery is received in the receptacle;
   an electrical switch on the first end of said battery housing, said electrical switch having an externally accessible actuator for making and breaking an electrical connection between a first electrical switch contact and a second electrical switch contact;
   a pattern of externally accessible electrical contacts on the second end of said battery housing, wherein one of said externally accessible electrical contacts is connected to a first of the two electrical contacts of the receptacle;
   a first electrical conductor connected to a second of the two electrical contacts of the receptacle and to a second one of the externally accessible electrical contacts;
   a second electrical conductor connected to a third one of the externally accessible electrical contacts; and
   wherein the first electrical switch contact of said electrical switch is coupled to the second of the two electrical contacts of the receptacle and the second electrical switch contact of said electrical switch is coupled to said second electrical conductor.

2. The battery assembly of claim 1 wherein the pattern of externally accessible electrical contacts defines a symmetrical pattern wherein:
   the third one of the externally accessible electrical contacts is located centrally within the pattern;
   the first one of the externally accessible electrical contacts is located symmetrically on the pattern with a fourth one of the externally accessible electrical contacts; and
   the second one of the externally accessible electrical contacts is located symmetrically on the pattern with a fifth one of the externally accessible electrical contacts,
   whereby connection to said battery assembly may be made by three contacts of a use device with said battery assembly being in at least two different orientations relative to the three contacts of the use device.

3. The battery assembly of claim 2 wherein:
   the first, second, fourth and fifth ones of the externally accessible electrical contacts are disposed at corners of a square pattern with the third one of the externally accessible electrical contacts at the intersection of diagonals thereof; or
   the first, second, fourth and fifth ones of the externally accessible electrical contacts are disposed around a circular pattern with the third one of the externally accessible electrical contacts at the center of the circle.

4. The battery assembly of claim 1 wherein said battery housing has longitudinal direction and a transverse cross-section defining a flattened cylindrical shape, an oval shape or an elliptical shape, and wherein the receptacle is along the longitudinal direction.

5. The battery assembly of claim 1 wherein:
   the first and second ends of said battery housing are connected by a central web therebetween, and wherein a space adjacent to the central web and between the first and second ends defines the receptacle into which a battery may be placed; or
   the first and second ends of said battery housing are connected at respective central regions thereof by a central web, wherein two spaces adjacent opposite sides of the central web between the first and second ends define two receptacles into which batteries may be placed.

6. The battery assembly of claim 1 further comprising a first cover on the first end of said battery housing having an opening therethrough, wherein said electrical switch is disposed between said first cover and the first end of said battery housing, and wherein the actuator of said electrical switch is disposed in the opening of said first cover.

7. The battery assembly of claim 1 wherein actuation of said electrical switch provides signaling including presenting two or more different voltage levels or presenting two or more different resistance values.

8. The battery assembly of claim 1 further comprising:
an electrical circuit board adjacent the second end of said battery housing, said electrical circuit board having a pattern of electrically conductive features thereon that correspond to the pattern of externally accessible electrical contacts on the second end of said battery housing; and
a second cover on the second end of said battery housing having a pattern of openings therethrough that correspond to the pattern of externally accessible electrical contacts on the second end of said battery housing,
wherein the pattern of electrically conductive features of said electrical circuit board aligns with the pattern of openings of said second cover to provide the externally accessible electrical contacts on the second end of said battery housing.

9. The battery assembly of claim 2 wherein the first and fourth ones of the externally accessible electrical contacts are coupled to a first one of the at least two electrical contacts to which respective terminals of the battery connect, wherein the second and fifth ones of the externally accessible electrical contacts are coupled to a second one of the at least two electrical contacts to which respective terminals of the battery connect.

10. The battery assembly of claim 9 wherein the third one of the externally accessible electrical contacts is coupled to one of the at least two electrical contacts to which respective terminals of the battery connect by said electrical switch and by said electrical switch and a resistance.

11. The battery assembly of claim 9 wherein said electrical switch has an open position, a first closed position and a second closed position, wherein the second electrical switch contact of said electrical switch is connected to said second electrical conductor in the first closed position and is connected to said second electrical conductor via a resistance in the second closed position.

12. The battery assembly of claim 1 in combination with a light body comprising:
a body housing having a cavity therein for receiving said battery assembly; and
a cover covering an opening into the cavity of said body housing wherein said cover is openable for placing and removing said battery assembly in the cavity of said body housing, wherein:
said cover has an opening through which said electrical switch is actuatable from external to said light body; or
said cover has a flexible seal covering an opening through which said electrical switch is actuatable from external to said light body; or
said cover has a flexible seal covering an opening through which said electrical switch is actuatable from external to said light body and providing a seal between said cover and said body housing at the opening into the cavity of said body housing.

13. A battery assembly comprising:
a battery housing having first and second ends and having a receptacle for receiving a battery therein, the receptacle having at least two electrical contacts to which respective terminals of the battery connect when the battery is received in the receptacle;
an electrical switch on the first end of said battery housing, said electrical switch having an externally accessible actuator for making and breaking an electrical connection between a first electrical switch contact and a second electrical switch contact;
a symmetrical pattern of externally accessible electrical contacts on the second end of said battery housing, wherein the symmetrical pattern includes:
first and second externally accessible electrical contacts;
the third one of the externally accessible electrical contacts is located centrally within the pattern;
the first one of the externally accessible electrical contacts is located symmetrically on the pattern with a fourth one of the externally accessible electrical contacts; and
the second one of the externally accessible electrical contacts is located symmetrically on the pattern with a fifth one of the externally accessible electrical contacts,
wherein the first of said externally accessible electrical contacts is connected to a first of the two electrical contacts of the receptacle;
a first electrical conductor connected to a second of the two electrical contacts of the receptacle and to the second externally accessible electrical contact;
a second electrical conductor connected to the third externally accessible electrical contact; and
wherein the first electrical switch contact of said electrical switch is coupled to the second of the two electrical contacts of the receptacle and the second electrical switch contact of said electrical switch is coupled to said second electrical conductor,
whereby connection to said battery assembly may be made by three contacts of a use device contacts with said battery assembly being in at least two different orientations relative to the three contacts of the use device.

14. The battery assembly of claim 13 wherein:
the first, second, fourth and fifth ones of the externally accessible electrical contacts are disposed at corners of a square pattern with the third one of the externally accessible electrical contacts at the intersection of diagonals thereof; or
the first, second, fourth and fifth ones of the externally accessible electrical contacts are disposed around a circular pattern with the third one of the externally accessible electrical contacts at the center of the circle.

15. The battery assembly of claim 13 wherein said battery housing has longitudinal direction and a transverse cross-section defining a flattened cylindrical shape, an oval shape or an elliptical shape, and wherein the receptacle is along the longitudinal direction.

16. The battery assembly of claim 13 wherein:
the first and second ends of said battery housing are connected by a central web therebetween, and wherein a space adjacent to the central web and between the first and second ends defines the receptacle into which a battery may be placed; or
the first and second ends of said battery housing are connected at respective central regions thereof by a central web, wherein two spaces adjacent opposite sides of the central web between the first and second ends define two receptacles into which batteries may be placed.

17. The battery assembly of claim 13 further comprising a first cover on the first end of said battery housing having an opening therethrough, wherein said electrical switch is disposed between said first cover and the first end of said battery housing, and wherein the actuator of said electrical switch is disposed in the opening of said first cover.

18. The battery assembly of claim 13 wherein actuation of said electrical switch provides signaling including presenting two or more different voltage levels or presenting two or more different resistance values.

19. The battery assembly of claim 13 further comprising:
an electrical circuit board adjacent the second end of said battery housing, said electrical circuit board having a pattern of electrically conductive features thereon that correspond to the pattern of externally accessible electrical contacts on the second end of said battery housing; and
a second cover on the second end of said battery housing having a pattern of openings therethrough that correspond to the pattern of externally accessible electrical contacts on the second end of said battery housing,
wherein the pattern of electrically conductive features of said electrical circuit board aligns with the pattern of openings of said second cover to provide the externally accessible electrical contacts on the second end of said battery housing.

20. The battery assembly of claim 13 wherein the first and fourth ones of the externally accessible electrical contacts are coupled to a first one of the at least two electrical contacts to which respective terminals of the battery connect, wherein the second and fifth ones of the externally accessible electrical contacts are coupled to a second one of the at least two electrical contacts to which respective terminals of the battery connect.

21. The battery assembly of claim 20 wherein the third one of the externally accessible electrical contacts is coupled to one of the at least two electrical contacts to which respective terminals of the battery connect by said electrical switch and by said electrical switch and a resistance.

22. The battery assembly of claim 20 wherein said electrical switch has an open position, a first closed position and a second closed position, wherein the second electrical switch contact of said electrical switch is connected to said second electrical conductor in the first closed position and is connected to said second electrical conductor via a resistance in the second closed position.

23. The battery assembly of claim 13 in combination with a light body comprising:
a body housing having a cavity therein for receiving said battery assembly; and
a cover covering an opening into the cavity of said body housing wherein said cover is openable for placing and removing said battery assembly in the cavity of said body housing, wherein:
said cover has an opening through which said electrical switch is actuatable from external to said light body; or
said cover has a flexible seal covering an opening through which said electrical switch is actuatable from external to said light body; or
said cover has a flexible seal covering an opening through which said electrical switch is actuatable from external to said light body and providing a seal between said cover and said body housing at the opening into the cavity of said body housing.

\* \* \* \* \*